US008458583B2

(12) United States Patent
Kutsumi et al.

(10) Patent No.: US 8,458,583 B2
(45) Date of Patent: Jun. 4, 2013

(54) DOCUMENT IMAGE GENERATING APPARATUS, DOCUMENT IMAGE GENERATING METHOD AND COMPUTER PROGRAM

(75) Inventors: Takeshi Kutsumi, Osaka (JP); Ai Fujiwara, Osaka (JP); Ichiko Sata, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 97 days.

(21) Appl. No.: 13/034,171

(22) Filed: Feb. 24, 2011

(65) Prior Publication Data

US 2011/0209044 A1   Aug. 25, 2011

(30) Foreign Application Priority Data

Feb. 25, 2010 (JP) ................................. 2010-040589

(51) Int. Cl.
*G06F 17/00* (2006.01)
(52) U.S. Cl.
USPC ........................................................ 715/232
(58) Field of Classification Search
USPC ................. 715/230, 232, 231, 275, 277, 271, 715/264
See application file for complete search history.

(56) References Cited

U.S. PATENT DOCUMENTS

| | | | | |
|---|---|---|---|---|
| 5,581,670 A * | 12/1996 | Bier et al. | ...................... | 715/856 |
| 5,581,682 A * | 12/1996 | Anderson et al. | ............. | 715/236 |
| 5,875,265 A * | 2/1999 | Kasao | ............................ | 382/229 |
| 6,470,306 B1 * | 10/2002 | Pringle et al. | ...................... | 704/3 |
| 7,237,193 B1 * | 6/2007 | Zaky et al. | ...................... | 715/207 |
| 7,590,541 B2 * | 9/2009 | Virji et al. | ...................... | 704/270 |
| 7,783,986 B2 * | 8/2010 | Barsness et al. | ............. | 715/776 |
| 7,894,098 B1 * | 2/2011 | Dalton | ............................ | 358/1.9 |
| 7,912,289 B2 * | 3/2011 | Kansal et al. | ................. | 382/181 |
| 2004/0045030 A1 * | 3/2004 | Reynolds et al. | ............. | 725/110 |
| 2004/0090644 A1 * | 5/2004 | Nishikawa | ................... | 358/1.13 |
| 2004/0103090 A1 * | 5/2004 | Dogl et al. | ......................... | 707/3 |
| 2005/0210384 A1 * | 9/2005 | Klassen et al. | ................. | 715/534 |
| 2006/0092170 A1 * | 5/2006 | Bathiche et al. | .............. | 345/589 |
| 2006/0259853 A1 * | 11/2006 | Zellweger et al. | ......... | 715/500.1 |
| 2007/0195081 A1 * | 8/2007 | Fischer | ......................... | 345/418 |
| 2008/0065990 A1 * | 3/2008 | Harrison et al. | ............. | 715/719 |
| 2009/0144628 A1 * | 6/2009 | Stevens et al. | ................ | 715/733 |
| 2010/0185968 A1 * | 7/2010 | Hsu et al. | ...................... | 715/771 |

FOREIGN PATENT DOCUMENTS

| | | |
|---|---|---|
| JP | 03-105557 | 5/1991 |
| JP | 2005-157412 | 6/2005 |
| JP | 2006-270589 A | 10/2006 |
| JP | 2007-079946 | 3/2007 |
| JP | 2009-053838 | 3/2009 |

* cited by examiner

*Primary Examiner* — Laurie Ries
(74) *Attorney, Agent, or Firm* — Edwards Wildman Palmer LLP; David G. Conlin; Edmund J. Koundakjian

(57) ABSTRACT

It is expected to provide a document image generating apparatus, a document image generating method and a computer program that can keep a layout of original text present in the original text image and then can improve the readability of original text and the readability annotation corresponding to the original text (e.g., translation).

A translation 421 of original text 411 is aligned at the interline space between the original text 411 at the first line and the original text 412 at the second line. When the interline space is narrow as shown in FIG. 4B, the original text 411 overlays the translation 421. At that time, the color regarding the original text 411 is changed to be a low visibility color, and the color regarding the translation 421 is changed to be a high visibility color.

17 Claims, 18 Drawing Sheets

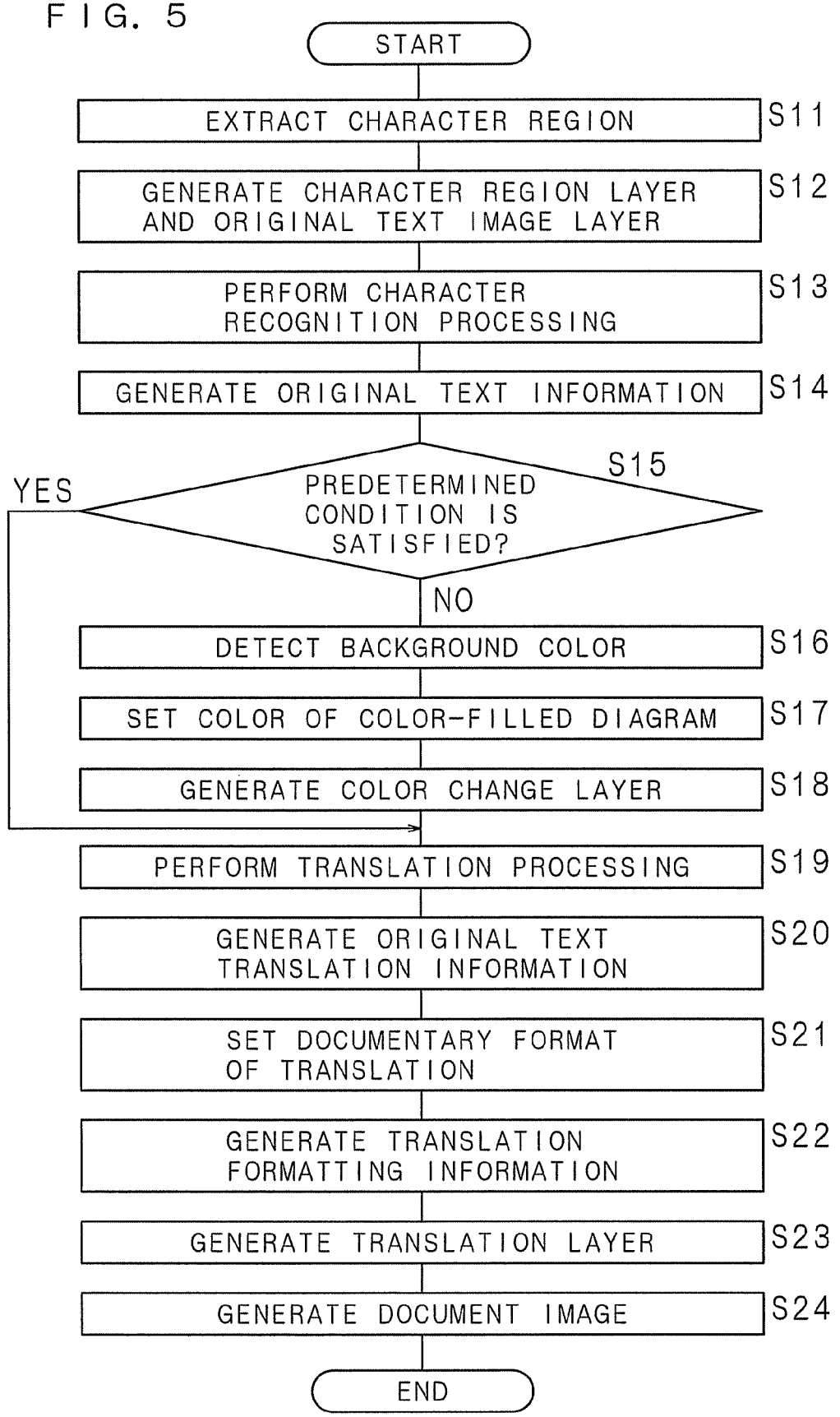

FIG. 9

| CHARACTER NUMBER | LEFT-X COORDINATE | TOP-Y COORDINATE | RIGHT-X COORDINATE | BOTTOM-Y COORDINATE | REGION NUMBER | POSITION IN ROW | FONT SIZE | RECOGNIZED CHARACTER |
|---|---|---|---|---|---|---|---|---|
| 2617 | 37 | 290 | 43 | 284 | 5 | 1 | 7 | X |
| 2618 | 43 | 286 | 46 | 285 | 5 | 0 | 7 | - |
| 2619 | 46 | 288 | 49 | 283 | 5 | 0 | 7 | r |
| 2620 | 49 | 288 | 53 | 283 | 5 | 0 | 7 | a |
| 2621 | 54 | 288 | 57 | 282 | 5 | 0 | 7 | y |
| 2622 | 54 | 288 | 57 | 282 | 5 | 0 | 7 |  |
| 2623 | 62 | 288 | 65 | 283 | 5 | 0 | 7 | c |
| 2624 | 66 | 288 | 69 | 283 | 5 | 0 | 7 | r |
| 2625 | 69 | 287 | 73 | 282 | 5 | 0 | 7 | y |
| 2626 | 73 | 288 | 76 | 283 | 5 | 0 | 7 | s |
| 2627 | 77 | 288 | 79 | 283 | 5 | 0 | 7 | t |
| 2628 | 79 | 288 | 83 | 283 | 5 | 0 | 7 | a |
| 2629 | 83 | 289 | 85 | 283 | 5 | 0 | 7 | l |
| 2630 | 86 | 289 | 88 | 283 | 5 | 0 | 7 | l |
| 2631 | 89 | 287 | 92 | 283 | 5 | 0 | 7 | o |
| 2632 | 93 | 287 | 97 | 281 | 5 | 0 | 7 | g |
| 2633 | 98 | 287 | 100 | 283 | 5 | 0 | 7 | r |
| 2634 | 101 | 287 | 104 | 283 | 5 | 0 | 7 | a |
| 2635 | 105 | 287 | 109 | 281 | 5 | 0 | 7 | p |
| 2636 | 109 | 289 | 113 | 283 | 5 | 0 | 7 | h |
| 2637 | 113 | 289 | 115 | 283 | 5 | 0 | 7 | i |
| 2638 | 116 | 287 | 119 | 283 | 5 | 2 | 7 | c |
| 2639 | 37 | 278 | 41 | 284 | 5 | 1 | 7 | a |
| 2640 | 41 | 278 | 45 | 284 | 5 | 0 | 7 | n |
| 2641 | 46 | 278 | 49 | 284 | 5 | 0 | 7 | a |
| 2642 | 49 | 230 | 51 | 284 | 5 | 0 | 7 | l |
| 2643 | 52 | 278 | 56 | 284 | 5 | 0 | 7 | y |
| 2644 | 56 | 278 | 59 | 283 | 5 | 0 | 7 | s |
| 2645 | 60 | 279 | 61 | 283 | 5 | 0 | 7 | i |
| 2646 | 62 | 278 | 65 | 283 | 5 | 0 | 7 | s |

FIG. 10A

511 → X-ray crystallographic analysis also confirmed the molecular structure.

FIG. 10B

511 → X-ray crystallographic analysis also confirmed the molecular structure.

FIG. 11A

| ORIGINAL TEXT PHRASE | TRANSLATION PHRASE |
|---|---|
| X-ray | X線 |
| crystallographic | 結晶学の |
| analysis | 分析 |
| confirmed | 確認する |
| molecular | 分子の |
| structure | 構造 |

FIG. 11B

| ORIGINAL TEXT PHRASE | TRANSLATION PHRASE |
|---|---|
| X-ray crystallographic analysis | X線結晶解析 |
| confirmed | 確認する |
| molecular | 分子の |
| structure | 構造 |

51a, 51b, 51c, 51d 52a, 52b, 52c, 52d

| TRANSLATION FORMATTING INFORMATION | TRANSLATION PHRASE |
|---|---|
| 100.000000 Tz<br>1.0000 0.0000 0.0000 1.0000 37.00 279.15 Tm<br>/FJH 5.3 Tf<br>1.0 0.0 0.0 Rg<br>〈827790fc8c8b8fbb89f090cd〉Tj | X線結晶解析 |
| 100.000000 Tz<br>1.0000 0.0000 0.0000 1.0000 92.00 269.41 Tm<br>/FJH 5.3 Tf<br>1.0 0.0 0.0 Rg<br>〈8a6d944682b782e9〉Tj | 確認する |
| 100.000000 Tz<br>1.0000 0.0000 0.0000 1.0000 48.00 257.54 Tm<br>/FJH 5.3 Tf<br>1.0 0.0 0.0 Rg<br>〈95aa8e7182cc〉Tj | 分子の |
| 100.000000 Tz<br>1.0000 0.0000 0.0000 1.0000 87.00 257.54 Tm<br>/FJH 5.3 Tf<br>1.0 0.0 0.0 Rg<br>〈8d5c91a2〉Tj | 構造 |

DOCUMENT IMAGE GENERATING APPARATUS, DOCUMENT IMAGE GENERATING METHOD AND COMPUTER PROGRAM

CROSS-REFERENCE TO RELATED APPLICATION

This Nonprovisional application claims priority under 35 U.S.C. §119(a) on Patent Application No. 2010-040589 filed in Japan on Feb. 25, 2010, the entire contents of which are hereby incorporated by reference.

BACKGROUND OF THE INVENTION

1. Field of the Invention

The present invention relates to a document image generating apparatus, a document image generating method and a computer program that generate annotation-added document image representing an annotation-added document in which an annotation is added in an interline space of an original text.

2. Description of Related Art

It is conventionally known about a technique utilizing an image reading apparatus to read out an image recorded on a recording paper, a book or the like, and translating an original text represented by the read image (call "original text image", hereinafter: see Japanese Patent Application Laid-Open No. 2009-53838, and Japanese Patent Application Laid-Open No. 2005-157412). A translating apparatus described in Japanese Patent Application Laid-Open No. 2009-53838 translates an original text and then generates a translated document in which the translation result of original text (call "translation", hereinafter) is added as a ruby in the interline space of original text.

When the interline space is narrow, the translating apparatus fills the original text with background color of interline space and then adds the translation.

On the other hand, a translating apparatus described in Japanese Patent Application Laid-Open No. 2005-157412 generates a comparison table in which the translation is aligned with the original text.

In the present specification, a wording "interline space" means not only a space between lines but also a space corresponding to the space between lines (e.g., a space above the first line of a horizontally written text, a space under the last line of a horizontally written text and the like). Furthermore, in the present specification, a phrase "interline space is wide/narrow" means that the original text has a sufficient/insufficient distance in a direction perpendicular to the reading direction of the original text (e.g., a vertical direction of horizontally written text).

Moreover, in the present specification, a wording "character" means an alphanumeric character, a kanji character (Chinese character), a kana character, letter symbol character and the like.

SUMMARY OF THE INVENTION

However, the translating apparatus described in Japanese Patent Application Laid-Open No. 2005-157412 generates the comparison table that does not keep the layout of original text present in the original text image. Therefore, it is necessary to refer the original text image as well as the generated comparison table, for considering the layout of original text.

On the other hand, the translating apparatus described in Japanese Patent Application Laid-Open No. 2009-53838 generates the translated document that keeps the layout of original text present in the original text image. However, when the original text is filled with background color, it is necessary to refer the original text image as well as the translated document, for considering the original text.

If the original text is not filled with the background color in the case that the interline space is narrow, the character of original text is overlaid on the character of translation and it is difficult to read not only the original text but also the translation.

Although it can be considered to reduce the character size of translation for preventing the character of translation from overlaying on the character of original text, it is difficult to read the translation with too small character.

The present invention is made in view of such circumstances and has an object to provide a document image generating apparatus, a document image generating method and a computer program that can utilize a configuration compositing an original image having a color with an annotation having another color and can keep the layout of original text in the original text image, for improving the readability of original text and annotation.

According to an aspect of the present invention, a document image generating apparatus includes a setting means, a generating means and a compositing means. The document image generating apparatus implements a document image generating method according to the present invention. A computer program according to an aspect of the present invention utilizes hardware elements of computer to implement, in software, the several means included in the document image generating apparatus according to the present invention.

An original text includes a color.

An annotation is for the original text (e.g., a translation that is a translated result of original text).

The setting means sets a color of annotation different from the color of original text. The color of annotation different from the color of original text means that the annotation has a hue, a saturation, a lightness, a transparency and the like and at least one of them is different from one of a hue, a saturation, a lightness, a transparency and the like in the original text. Such colors may be chromatic colors or achromatic colors.

The generating means is for generating an annotation layer that represents the annotation having the different color set by the setting means.

The compositing means is for compositing an original text layer based on the original text image with the annotation layer generated by the generating means, to generate an annotation-added document image.

The generated annotation-added document image represents an annotation-added document in which the annotation is added into an interline space of original text having a color different from the color of annotation.

Since the original text layer is based on the original text image, a layout of original text represented by the original text layer is substantially equal to an original layout of original text present in the original text image. In other words, the layout of original text can be kept.

When the interline space is narrow for the size of character included in the annotation, the annotation-added document image may look overlaying the character included in the original text on the character included in the annotation.

However, the color of original text is different from the color of annotation. The readability of original text and annotation is improved better than the case that the color of original text is equal to the color of annotation. In other words, it is easy to read not only the original text but also the annotation.

Since the color of original text is different from the color of annotation, the readability of original text and annotation is improved even in the case that the interline space is wide for the size of character included in the annotation.

According to an aspect of the present invention, the document image generating apparatus further includes a deciding means and a changing means.

For example, in the case that the original text is written with a dark color, such as a black color or a navy color, it is easy in general to see the original text (in other words, the original text has a high visibility). Thus, merely setting the color of annotation different from the color of original text may cause a circumstance that it is harder to see the annotation than to see the original text or a circumstance that the original text having the high visibility interferes with the annotation having a high visibility and thus it is hard to read the original text and the annotation.

Therefore, the deciding means is utilized for deciding whether the color of original text satisfies a predetermined condition or not. In the example described above, the deciding means is utilized for determining whether the color of original text is light or not.

When the color of original text does not satisfy the predetermined condition, i.e., when the deciding means has decided that it does not, the changing means works for changing the color of original text to be a color satisfying the predetermined condition. In the example described above, the changing means works for changing the dark color of original text to be a light color.

When the color of original text satisfies the predetermined condition, the color of original text is not changed. In the example described above, the color of original text is kept to be light.

The setting means is for setting the color of annotation to be a different color not satisfying the predetermined condition. In the example described above, the setting means works for setting the color of annotation to be a dark color.

Then, the compositing means works for compositing the original text layer with the annotation layer to generate an annotation-added document image.

The generated annotation-added document image represents an annotation-added document in which the annotation having the color not satisfying the predetermined condition is added into the interline space of original text having a color satisfying the predetermine condition (i.e., the color of original text is different from the color of annotation). Therefore, it is possible to improve the visibility of annotation in the example described above. Furthermore, it is possible to prevent the circumstance that the original text having the high visibility interferes with the annotation having the high visibility and it becomes hard to read the original text and the annotation.

On the contrary to the example described above, it is possible to change the color of original text from a light color to a dark color and to set the color of annotation to be light, although it depends on the predetermined condition. In this contrary example, it is possible to improve the visibility of original text. Furthermore, it is possible to prevent the circumstance that the original text having the high visibility interferes with the annotation having the high visibility and it becomes hard to read the original text and the annotation.

According to an aspect of the present invention, the setting means works for setting the different color of annotation to be a color having the lower visibility than the color of original text and a color having the higher visibility than the color of original text, and these set colors are prepared to be selectable. Hereinafter, the color having lower visibility is referred to as a hard-to-read color, and the color having higher visibility is referred to as an easy-to-read color.

The compositing means works for associating a selecting means and a selecting means and a replacing means with the annotation-added image.

After obtaining the annotation-added document image, a user utilizes the selecting means for selecting a mode preferring the visibility of original text or a mode preferring the visibility of annotation. It is not limited to that the user manually utilizes the selecting means to perform the selection. The selection may be performed automatically in response to a predetermined condition. For example, when the original text is written in Japanese (or in English), the visibility of original text (or annotation) is preferred. For example, when the annotation is a kana pronouncing (or a translation) regarding the original text, the visibility of original text (or annotation) is preferred.

When the mode preferring the visibility of original text is selected by the selecting means, the replacing means works for replacing the color of annotation to be the hard-to-read color. At that time, the annotation-added document image represents the annotation-added document in which the annotation having the hard-to-read color is added into the interline space of original text having the easy-to-read color.

On the other hand, when the mode preferring the visibility of annotation is selected by the selecting means, the replacing means works for replacing the color of annotation to be the easy-to-read color. At that time, the annotation-added document image represents the annotation-added document in which the annotation having the easy-to-read color is added into the interline space of original text having the hard-to-read color.

Therefore, it is possible to improve the visibility of original text (or annotation) higher than the visibility of annotation (or original text) in the mode preferring the visibility of original text (or annotation). In other words, the document image generating apparatus according to the present invention can improve one visibility higher than the other visibility among the visibilities of original text and annotation, in accordance with the priority order selected by the selecting means.

According to an aspect of the present invention, the annotation should be divided into predetermined units and the setting means works for setting the color of annotation by respective predetermined units. The predetermined units herein are character units, word/phrase units, line units, sentence units, character string units configured with aligned successive characters having the same color in the original text or the like.

In this case, the document image generating apparatus according to the present invention can improve the readability of annotation, too. Or, the document image generating apparatus according to the present invention can reflect an intention of documenter, who has written the original text, into the annotation.

For example, when the original text is configured with plural English sentences and the annotation is configured with plural Japanese sentences which are translation results of the plural English sentences, it is possible to improve the readability of these Japanese sentences higher by making a color of one Japanese sentence regarding one English sentence become different from a color of another Japanese sentence regarding another English sentence, than by making the color of one Japanese sentence regarding one English sentence become equal to the color of another Japanese sentence regarding another English sentence.

For example, when the original text is configured with plural words and one word has a easy-to-read color (so called highlighted color) better than another word, and further when a color of word in the annotation regarding to the word having the highlighted color is different from a color of word in the annotation regarding to the word not having the highlighted color, it is possible to reflect the distinction of respective words included in the original text, into the annotation.

According to an aspect of the present invention, the changing means works for generating a color change layer when the color of original text does not satisfy the predetermine condition. Hereinafter, a wording "post-changing color" is utilized for indicating a color that satisfies the predetermined condition and has a visibility, lower than the color of original text in the original text image.

In addition, the compositing means works for compositing the color change layer generated by the changing means with the original text layer and the annotation layer.

At that time, the generated annotation-added document image represents the annotation-added document in which the annotation is added in the interline space of original text having the post changing color, and the added annotation has a color not satisfying the predetermined condition but being readable easier than the post changing color.

Therefore, it is possible to reduce the visibility of original text but enhance the visibility of annotation.

If the color change layer was removed from the annotation-added document image, the annotation-added document image represents the annotation-added document that includes the original text having the same color with the color of original text in the original text image. In short, it is possible to replace the color of original text with the pre-changing color/the post-changing color, by selecting the use/disuse of color change layer.

In other words, the document image generating apparatus according to the present invention can change the visibility of original text without directly modifying the original text itself, although the original text is represented with the original text layer.

The color change layer is, for example, a mask layer that has a predetermined transparency as a whole. This mask layer is composited with the original text layer and the annotation layer to generate the annotation-added document image. The generated annotation-added document image represents the annotation-added document that includes the original text transparently seen through the mask layer. The original text transparently seen through the mask layer looks paler and thus has a lower visibility, than the original text not transparently seen through the mask layer, i.e., the archetype original text.

According to an aspect of the present invention, the color change layer means a layer in which a color-filled diagram having a predetermined transparency is arranged at a position corresponding to an alignment position of original text in the original text layer (hereinafter, referred to as a diagram layer).

When a mask layer is utilized as the color change layer and the whole of mask layer has a predetermined transparency, the mask layer may cover objects (e.g., diagrams), except for the original text, which are included in the original text layer. If the objects except for the original text were expressed transparently through the mask layer, the visibility of objects may be reduced even in the case the visibility of objects should not be reduced.

On the contrary, when the diagram layer described above is utilized as the color change layer, only the original text can be covered by the color-filled diagram. At that time, the original text is expressed transparently through the color-filled diagram in the annotation-added document image, but the objects except for the original text are expressed normally.

Therefore, it is possible to prevent the visibility of objects from being reduced, even when the visibility of objects should not be reduced.

In other words, the document image generating apparatus according to the present invention can reduce the visibility of predetermined portion and further compatibly keep the visibility of portions except for the predetermined portion.

According to an aspect of the present invention, the color change layer means a layer in which a rectangular diagram having a predetermined transparency is arranged at a position corresponding to an alignment position of original text in the original text layer (hereinafter, referred to as a character layer).

When a mask layer is utilized as the color change layer and the whole of mask layer has a predetermined transparency, the mask layer may cover objects (e.g., diagrams), except for the original text, which are included in the original text layer. If the objects except for the original text were expressed transparently through the mask layer, the visibility of objects may be reduced even in the case the visibility of objects should not be reduced.

On the contrary, when the character layer described above is utilized as the color change layer, only the original text can be covered by the rectangular diagram. At that time, the original text is expressed transparently through the rectangular diagram in the annotation-added document image, but the objects except for the original text are expressed normally. Therefore, it is possible to prevent the visibility of objects from being reduced, even when the visibility of objects should not be reduced.

In other words, the document image generating apparatus according to the present invention can reduce the visibility of predetermined portion and further compatibly keep the visibility of portions except for the predetermined portion.

According to an aspect of the present invention, one rectangular diagram is arranged for each of predetermined units into which the annotation should be divided. The predetermined units herein are character units, line units, paragraph units, column units, page units or the like. Therefore, it is possible to appropriately set a vertical magnification and a horizontal magnification of each rectangular diagram.

For example, in the case of character units, one character included in the original text is covered by one rectangular diagram. In this example case, the aspect ratio of rectangular diagram depends on the aspect ratio of one character. In addition, the alignment position of rectangular diagram corresponds to the alignment position of one character in the original text.

Therefore, the document image generating apparatus according to the present invention can reduce the visibility of original text with the rectangular diagram having the predetermined transparency.

According to an aspect of the present invention, plural rectangular diagrams are aligned for respective predetermined units into which the original text should be divided, and aligned plural rectangular diagrams are crowded. The plural rectangular diagrams respectively have character sizes which are the same with each other. The "predetermined units" means herein character units, row units, paragraph units, column units, page units or the like. Therefore, the alignment position of each rectangular diagram is set suitably.

For example, when the "predetermined units" means character units, one character in an original text is covered by the plural rectangular diagrams with no space between the plural rectangular diagrams.

Therefore, the document image generating apparatus according to the present invention can reduce the visibility of original text with the rectangular diagrams having a predetermined transparency.

According to an aspect of the present invention, one or more rectangular diagrams are aligned for each of predetermined units into which the original text should be divided. The "predetermined units" means herein character units, word/phrase units, row units or the like. Therefore, the aspect ratio of each rectangular diagram is set suitably and/or the alignment position of each rectangular diagram is set suitably.

Assume the case that the "predetermined units" means character units. For example, the characters "d" and "f" have portions protruding upward, in comparison with the characters "a" and "e". Contrarily, the characters "p" and "q" have portions protruding downward, in comparison with the characters "a" and "e".

Thus, when the rectangular diagrams covering the characters "a" and "e" are set to have the aspect ratio for forming square shape, the rectangular diagrams covering the characters "d", "f", "p" and "q" are set to have the aspect ratio for forming a vertically longitudinal rectangle shape.

Alternatively, it may be set that the rectangular diagrams covering the characters "d" and "f" are aligned upward more than the diagrams covering the characters "p" and "q".

Therefore, the document image generating apparatus according to the present invention can reduce the visibility of original text with the rectangular diagrams having a predetermined transparency.

According to an aspect of the present invention, the color of rectangular diagram is set to correspond the background color of original text. For example, the changing means sets the hue, saturation and lightness of rectangular diagram equal to the hue, saturation and lightness of background, but sets the transparency of rectangular diagram to be a predetermined transparency.

The rectangular diagram is obscure or almost invisible (i.e., the visibility of rectangular diagram is very low) in the annotation-added document image, because having the color corresponding to the background color. Therefore, it is possible to prevent the rectangular diagram from reducing the visibilities of original text and annotation too much.

According to an aspect of the present invention, the document image generating apparatus further include a limiting means.

In the case that the interline space is narrow, characters included in the annotation may happen to be covered by the rectangular diagram. When the characters included in the annotation are completely or almost covered by the rectangular diagram, the visibility of annotation may be reduced.

Thus, the limiting means sets the overlapping area between the region of annotation layer aligning characters included in the annotation and the region of color change layer aligning rectangular diagrams, to be a predetermined amount or less.

Therefore, the limiting means avoids the case that the characters included in the annotation are covered by the rectangular diagram too much, and the character size, aspect and/or alignment position of rectangular diagram are set suitably. Alternatively, the character size, aspect ratio and/or alignment position of character included in the annotation are set suitably.

Therefore, the document image generating apparatus can prevent the visibility of annotation from being reduced even when the interline space is narrow. In other words, it can be allowed that a part of each character included in the annotation is covered by the rectangular diagram.

In the document image generating apparatus, the document image generating method and the computer program according to the present invention, it is possible to keep the layout of original text shown in the archetype original text image. Furthermore, it is possible to improve the readabilities of original text and annotation.

Thus, it is possible from the annotation—added document image to know not only the original text and the annotation but also the layout of original text shown in the archetype original text image. In short, it is not required to see the archetype original text image. Therefore, it is enough to save only the annotation-added document image in the case that the archetype original text image is deleted. Hence, it is possible to save a required image efficiently in the document image generating apparatus, the document image generating method and the computer program according to the present invention.

Furthermore, it is not required to avoid the characters of original text overlaying the characters of annotation. Therefore, it is possible to suitably set the size of character included in the annotation as large as possible. In other words, it is possible to improve the readability of annotation.

The above and further objects and features of the invention will more fully be apparent from the following detailed description with accompanying drawings.

BRIEF DESCRIPTION OF THE DRAWINGS

FIG. 5 is a flowchart showing a procedure of image generation processing performed by the document image generating apparatus according to the embodiment 1 of the present invention.

FIG. 9 is a schematic view for explaining original text information generated by the document image generating apparatus according to the embodiment 1 of the present invention.

FIG. 10A and FIG. 10B are schematic views for explaining an adjustment processing of character string.

FIG. 11A and FIG. 11B are schematic views for explaining original text translation information generated by the document image generating apparatus according to the embodiment 1 of the present invention.

DESCRIPTION OF THE PREFERRED EMBODIMENTS

Hereinafter, embodiments of the present invention are described in detail with reference to figures.

Embodiment 1

Figure 1:
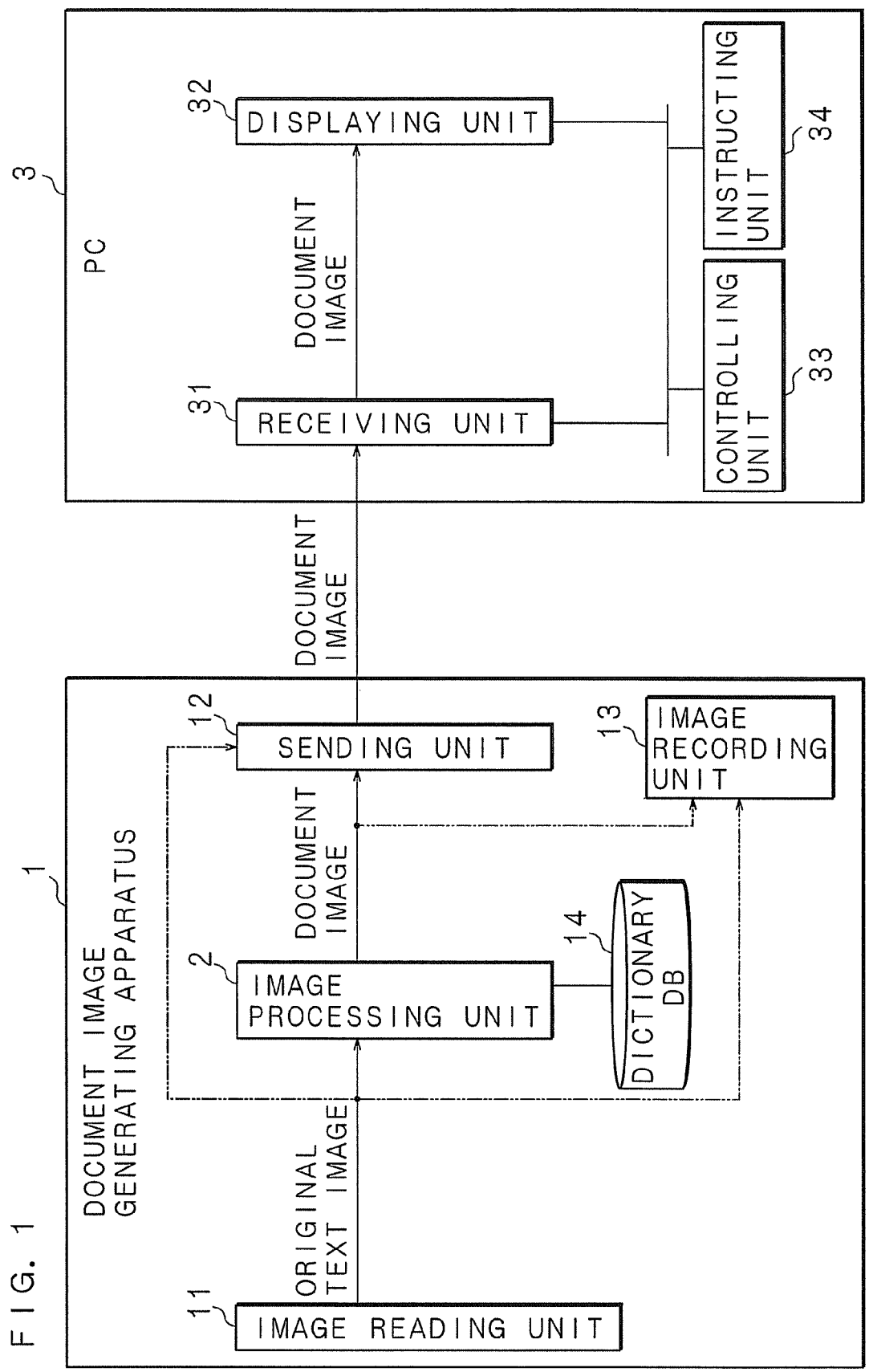
FIG. 1 is a block diagram showing a configuration of document image generating apparatus according to an embodiment 1 of the present invention.

FIG. 1 is a block diagram showing a configuration of document image generating apparatus according to an embodiment 1 of the present invention.

The document image generating apparatus 1 is a digital multi-function printer having a color scanner function, a color copy function and the like. The document image generating apparatus 1 is connected to a personal computer (PC) 3 through a LAN (not shown).

The document image generating apparatus 1 includes an image reading unit 11, a sending unit 12, an image recording unit 13, a dictionary database (dictionary DB) 14 and an image processing unit 2.

The image reading unit 11 consists of a color scanner, and optically reads a color image recorded on a recording paper, a book or the like placed on the image reading unit 11. The color image read by the image reading unit 11 (i.e., an original text image) is transferred to the sending unit 12, the image recording unit 13 or the image processing unit 2.

The image processing unit 2 generates a document image based on the transferred original text image. The generated document image is transferred to the sending unit 12 or the image recording unit 13.

The "document image" herein means an electronic document image in a so-called portable document format (PDF) and serves as an annotation-added document image in the embodiments of the present invention.

The sending unit 12 consists of a network adapter, and sends the transferred original text image or document image to the PC 3. In the case that the document image generating apparatus 1 serves as a color scanner apparatus, the original text image is transferred to the sending unit 12.

The image recording unit 13 consists of a color printer in an electrophotographic style, inkjet style or the like. The image recording unit 13 obtains a color image based on the transferred original text image or document image, and records the obtained color image on a recording sheet. In the case that the document image generating apparatus 1 serves as a color printer apparatus, the original text image is transferred to the image recording unit 13.

Hereinafter, it is described about an example case that the original text image is transferred to the image processing unit 2 and the document image is transferred to the sending unit 12.

The dictionary DB 14 is previously stored in a large capacity storage (not shown) included by the document image generating apparatus 1. The dictionary DB 14 stores several data required for implementing a step S19 described later.

The PC 3 includes a receiving unit 31, a displaying unit 32, a controlling unit 33 and an instructing unit 34.

The controlling unit 33 is a center for controlling the PC 3, utilizes a RAM (not shown) as a work area, and controls each unit of the PC 3 in accordance with a computer program stored in a ROM or a volatile large capacity storage (not shown) to perform several processing.

The receiving unit 31 consists of a network adapter, and receives the document image sent from the document image generating apparatus 1.

The displaying unit 32 consists of a liquid crystal display panel, and displays a color image based on the document image.

The instructing unit 34 consists of a keyboard and a mouse. A user of PC 3 handles the instructing unit 34 to input several instructions to the PC 3. The input instructions are transferred to the controlling unit 33.

Figure 2:
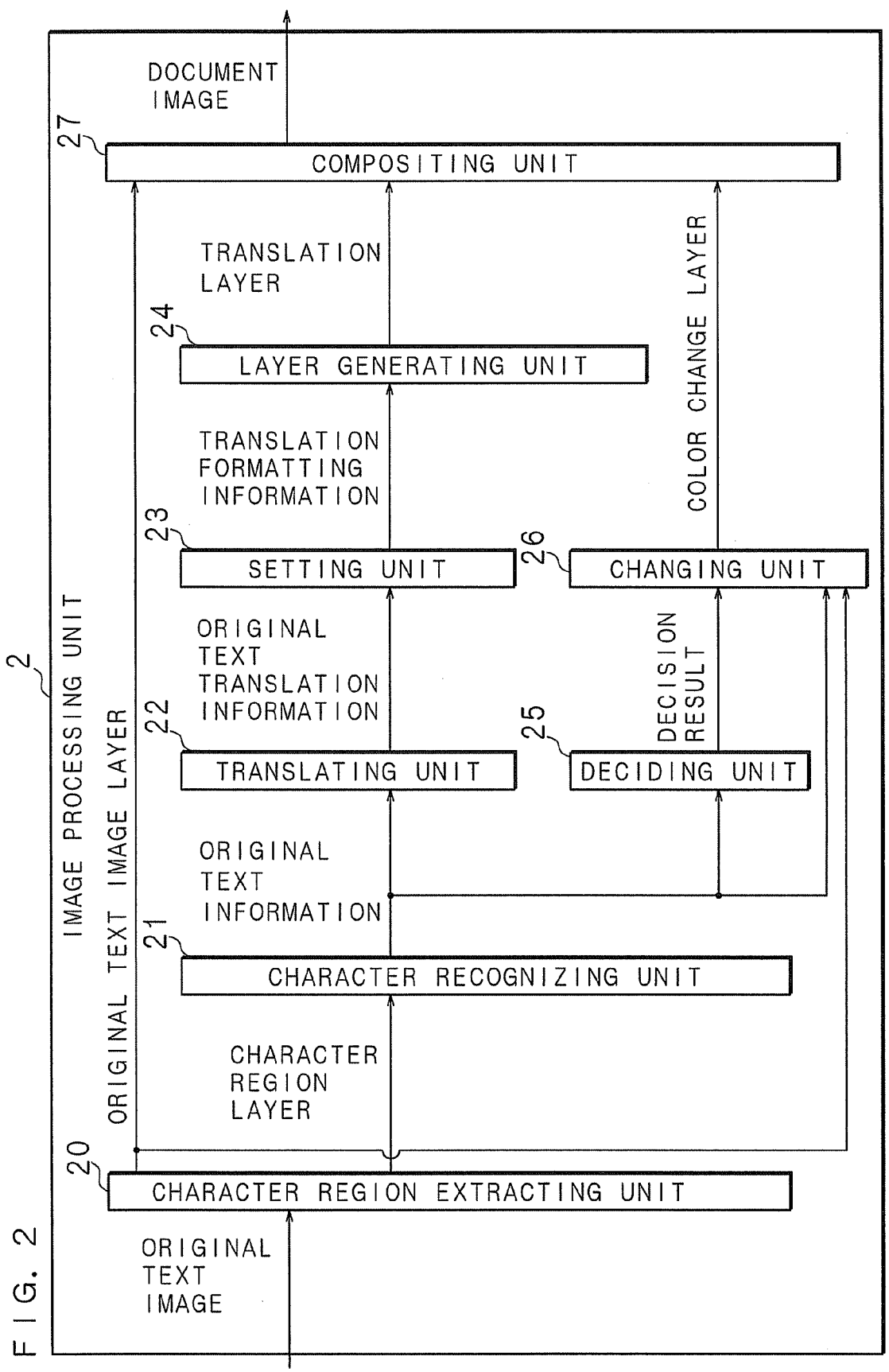
FIG. 2 is a functional block diagram for explaining a procedure performed by the document image generating apparatus according to the embodiment 1 of the present invention to generate a document image.

FIG. 2 is a functional block diagram for explaining a procedure performed by the document image generating apparatus 1 to generate a document image.

The image processing unit 2 consists of a MPU, and performs several processing in accordance with a computer program (i.e., the computer program according to this embodiment of the present invention) that is for implementing the document image generating method according to this embodiment of the present invention. Thus, the image processing unit 2 serves as a character region extracting unit 20, a character recognizing unit 21, a translating unit 22, a setting unit 23, a layer generating unit 24, a deciding unit 25, a changing unit 26 and a compositing unit 27.

Although serving as the center for controlling the document image generating apparatus 1, the controlling unit may serve as the image processing unit 2, too. Alternatively, it may be configured that the image processing unit 2 consists of one or more ASICs dedicated for image processing.

Figure 3A:
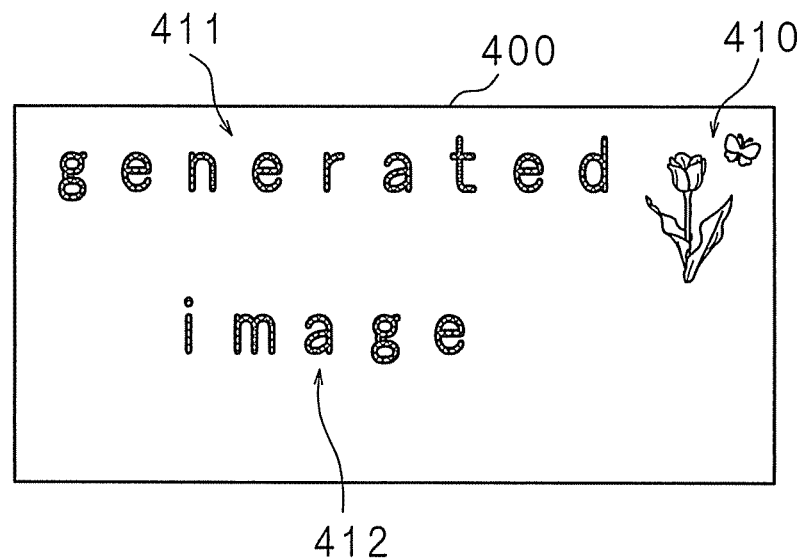
FIG. 3A and FIG. 3B are schematic views showing examples of original text image read by the document image generating apparatus according to the embodiment 1 of the present invention.
Figure 3B:
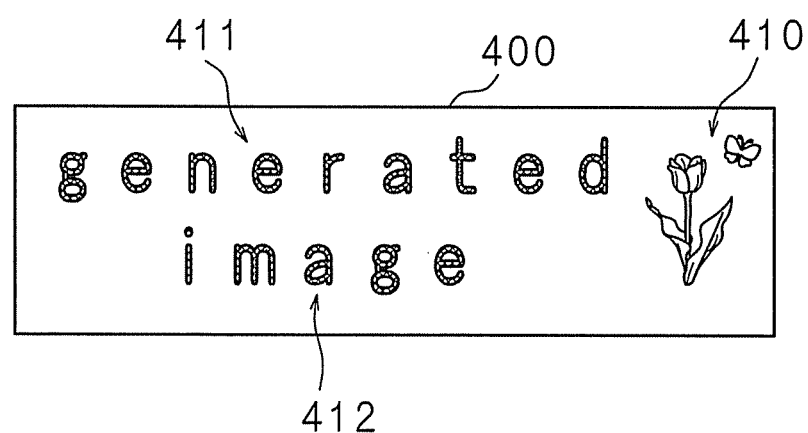

FIG. 3A and FIG. 3B are schematic views showing examples of original text image 400 read by the document image generating apparatus 1.

The original text image 400 shown in FIG. 3A as well as in FIG. 3B represents a document having a white background where original texts 411, 412 are horizontally written in black and a drawing 410 are arranged on the right side of the original texts 411, 412. The original text 411 is an English word "generated" arranged at the first line, and the original text 412 is an English word "image" arranged at the second line.

The text configured with the original texts 411, 412 is an example of multi-row "original text" according to this embodiment of the present invention. In the original text image 400, the original texts 411, 412 are shown as black. In the original text image 400, the background of original texts 411, 412 is shown as white (i.e., the background color is white).

Figure 4A:
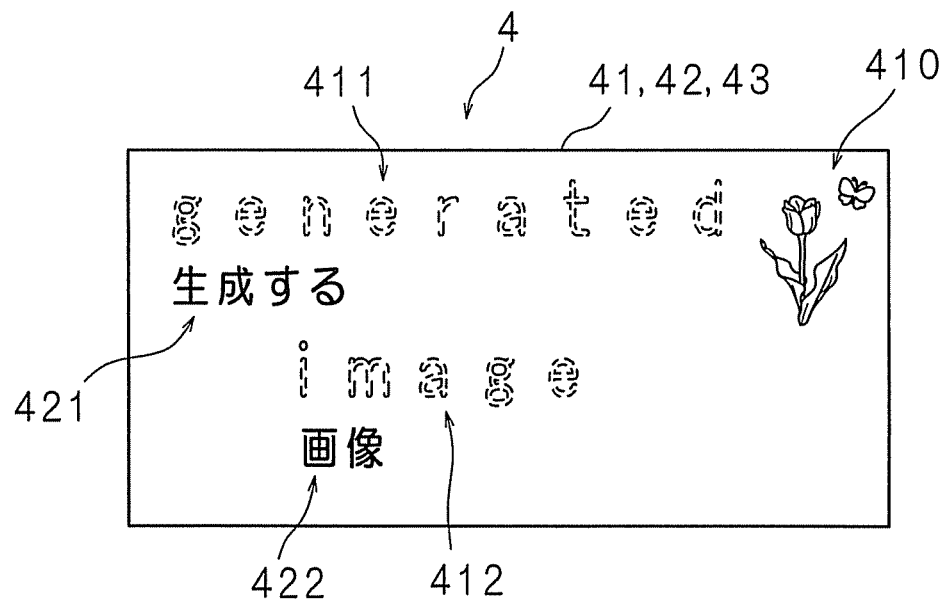
FIG. 4A and FIG. 4B are schematic views showing examples of document image generated by the document image generating apparatus according to the embodiment 1 of the present invention.
Figure 4B:
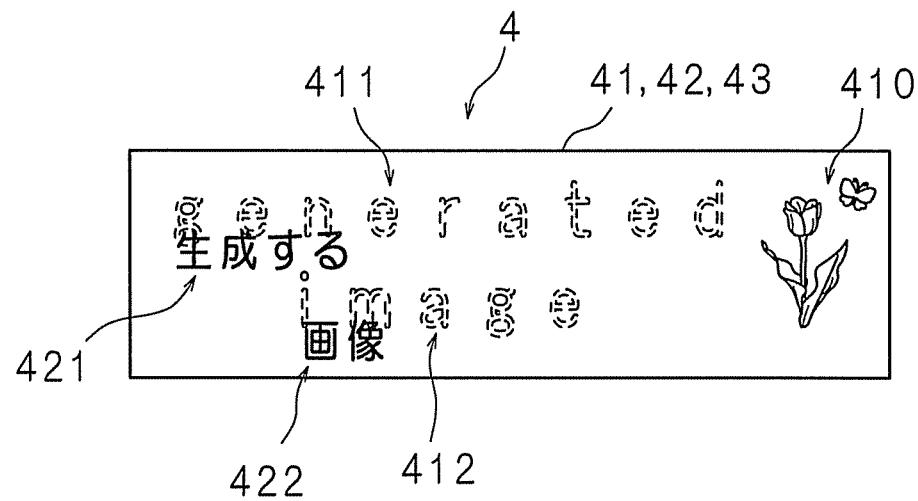

This embodiment is described in the context of original text image 400 where translations 421, 422, as shown in FIG. 4A and FIG. 4B, are added as ruby in the interline spaces under the original texts 411, 412. Thus, the "interline spaces" regarding the original texts 411, 412 herein mean a blank area between the original text 411 and the original text 412 and a blank area under the original text 412.

The original text image 400 shown in FIG. 3A is an example in the case that the interline spaces are wide (i.e., the vertical length of each interline space is long enough), and the original text image 400 shown in FIG. 3B is an example in the case that the interline spaces are narrow (i.e., the vertical length of each interline space is not long enough).

FIG. 4A and FIG. 4B are schematic views showing examples of document image 4 generated by the document image generating apparatus 1.

The document image 4 shown in FIG. 4A is generated by the image processing unit 2 on the basis of the original text image 400 shown in FIG. 3A, and the document image 4 shown in FIG. 4B is generated by the image processing unit 2 on the basis of the original text image 400 shown in FIG. 3B.

The document image 4 is a composite of original text image layer 41, translation layer 42 and color change layer 43 described later. In FIG. 4A and FIG. 4B, color-filled diagrams described later are omitted.

Like the original text image 400 shown in FIG. 3, the document image 4 shown in FIG. 4 represents a document having a white background where the original texts 411, 412 are horizontally written in black and the drawing 410 are arranged on the right side of original texts 411, 412. In other words, the document image 4 keeps the layout of original text image 400 regarding the original texts 411, 412 and the drawing 410.

However, it should be noted that the original texts 411, 412 in the document image 4 are shown as light black. In other words, the color of original texts 411, 412 is changed from the original color (i.e., the color of original texts 411, 412 in the document image 4 is changed from the color of original texts 411, 412 in the original text image 400).

Furthermore, the document image 4 represents a document where the translation 421 is shown horizontally as red in the interline space between the original text 411 and the original text 412 and the translation 422 is shown horizontally as red in the interline space under the original text 412.

The translation 421 is a Japanese word "生成する" into which the original text 411 is translated, and the translation 422 is a Japanese word "画像" into which the original text 412 is translated. These translations 421, 422 are examples of annotation according to this embodiment of the present invention. The color of translations 421, 422 is red in the document image 4.

As described above, the red translations 421, 422 are written in the interline spaces of light black original texts 411, 412 on the document represented by the document image 4. In other words, the document represented by the document image 4 is an example of annotation-added document according to this embodiment of the present invention, and the document image 4 is an example of annotation-added document image according to this embodiment of the present invention.

When the translations 421, 422 are added into the interline spaces of original text 411, 412 in the case that the interline spaces are wide as shown in FIG. 3A, no characters included in the translations 421, 422 overlay characters included in the original texts 411, 412 as shown in FIG. 4A.

Therefore, the readabilities of original texts 411, 412 are not reduced by the translations 421, 422. Vice versa, the readabilities of translations 421, 422 are not reduced by the original texts 411, 412.

Furthermore, the original texts 411, 412 are shown as light black and the translations 421, 422 are shown as red in the document image 4. In short, the colors of original texts 411, 412 are different from the colors of translations 411, 412. Therefore, the readabilities of original texts 411, 412 and translations 421, 422 are improved better than the case that the colors of original texts 411, 412 are the same as the colors of translations 411, 412.

When the translations 421, 422 are added into the interline spaces of original text 411, 412 in the contrary case that the interline spaces are narrow as shown in FIG. 3B, characters included in the translations 421, 422 overlay characters included in the original texts 411, 412 as shown in FIG. 4B.

Therefore, if the colors of original texts 411, 412 were the same as the colors of translations 411, 412 in the document image 4, not only the readabilities of original texts 411, 412 but also the readabilities of translations 421, 422 are reduced.

Instead, the original texts 411, 412 are shown as light black and the translations 421, 422 are shown as red in the document image 4. In short, the colors of original texts 411, 412 are different from the colors of translations 411, 412. Therefore, the readabilities of original texts 411, 412 and translations 421, 422 are improved better than the case that the colors of original texts 411, 412 are the same as the color of translations 411, 412.

Furthermore, the colors of translations 421, 422 are easier to read than the colors of original texts 411, 412 in the document image 4. Therefore, the translations 421, 422 have higher visibilities than the original texts 411, 412 (i.e., the visibilities of translations 421, 422 are improved).

On the contrary, when the original texts 411, 412 are shown as original color (i.e., black) and the translations 421, 422 are shown as harder-read color (e.g., light blue) than the colors of original texts 411, 412 in the document image 4, the original texts 411, 412 become to have higher visibilities than the translations 421, 422 (i.e., the visibilities of original texts 411, 412 are improved).

The document image 4 according to this embodiment is configured to have an operation mode preferring the visibilities of original texts 411, 412 (referred to as "original text priority mode"), and another operation mode preferring the visibilities of translations 421, 422 (referred to as "translation priority mode"), and to allow users to select one of these operation modes. Therefore, when the translation priority mode is selected, the original texts 411, 412 are shown as light black and the translations 421, 422 are shown as red in the document image 4 as shown in FIG. 4A and FIG. 4B. On the other hand, when the original text priority mode is selected, the original texts 411, 412 are shown as black and the translations 421, 422 are shown as light blue in the document image 4. The word "shown" means herein, for example, to be displayed on the displaying unit 32 or to be recorded on a recording paper by the image recording unit 13.

The color of drawing 410 is not changed by the selection of original text priority mode and translation priority mode. Therefore, the visibility of drawing 410 is not changed.

It will be described below about the visibility of color.

When the background color is white, the easy-to-read color generally means to have low lightness, high saturation, high non-transparency and the like, and the hard-to-read color generally means to have high lightness, low saturation, high transparency and the like. In other words, the easy-to-read color (or hard-to-read color) means to have a large (or small) color difference for the background color.

In this embodiment, the black and red are utilized as the easy-to-read color, and the light black and light blue are utilized as the hard-to-read color.

Alternatively, it is possible to utilize a chromatic color (e.g., red, dark blue and the like) as the easy-to-read color and to utilize an achromatic color (e.g., black, gray and the like) as the hard-to-read color.

As described above, the original texts 411, 412 (or translations 421, 422) are shown as the easy-to-read color and the translations 421, 422 (or the original texts 411, 412) are shown as the hard-to-read color in the text image 4 according to this embodiment. When a pair of the easy-to-read color and the hard-to-read color has a relationship of complementary colors (i.e., the easy-to-read color and the hard-to-read color are of opposite hue in some color model), one of the pair shown in the easy-to-read color becomes to have the visibility improved much more.

Such a pair having the complementary colors relationship may be, for example, a pair of violet and yellow, a pair of red and blue green, or the like. In the former example, the easy-to-read color is violet and the hard-to-read color is yellow. In the latter example, the visibilities of red and blue green are distinguished from each other in brightness for darkness, because these visibilities are almost same as each other. In short, the easy-to-read color is dark red (or dark blue green), and the hard-to-read color is light blue green (or light red).

The easy-to-read colors of original texts 411, 412 may be different from the easy-to-read colors of translations 421, 422 in the document image 4 (e.g., one easy-to-read color is black and the other easy-to-read color is red). In the case that the interline spaces are wide, the easy-to-read colors of original texts 411, 412 may be the same (e.g., black) as the easy-to-read colors of translations 421, 422 in the document image 4.

FIG. 5 is a flowchart showing a procedure of image generation processing performed by the document image generating apparatus 1. After the image reading unit 11 reads an original text image, the image generation processing is performed by the image processing unit 2. At that time, the image processing unit 2 serves as the character region extracting unit 20, the character recognizing unit 21, the translating unit 22, the setting unit 23, the layer generating unit 24, the deciding unit 25, the changing unit 26 and the compositing unit 27 shown in FIG. 2. It will be described below in reference with FIG. 2 and FIG. 5 about the image generation processing.

The character region extracting unit 20 extracts a character region included in the original text image from the original text image (S11). In the case of original text image 400 shown in FIG. 3A and FIG. 3B, the character region includes the original texts 411, 412 but not the drawing 410.

Then, the character region extracting unit 20 generates character region layer data representing a character region layer and original text image layer data representing an original text image layer (S12).

The "character region layer" means herein a layer representing the character region extracted at the S11.

The original text image layer consists of the original text image read by the image reading unit 11. Particularly, the original text image layer includes an image into which the original text image (e.g., BMP format image) read by the image reading unit 11 is compressed to have a predetermined format (e.g., JPEG format). The original text image layer serves as the original text layer according to this embodiment of the present invention.

As generated in accordance with the original text image 400 shown in FIG. 3, the original text image layer 41 (see FIG. 4) includes the original texts 411, 412 and the drawing 410. The colors of original texts 411, 412 in the original text image layer 41 are the same as the colors of original texts 411, 412 in the original text image 400. Similarly, the color of drawing 410 in the original text image layer 41 is the same as the color of drawing 410 in the original text image 400. Further, the background color of the original text image layer 41 is the same as the background color of the original text image 400.

An image processing may be performed to replace all of similar colors included in the original text image layer 41 with a model color, e.g., for reducing the data amount of original text image layer 41. In this example, the colors included in the original text image 400 are not exactly the same as the colors included in the original text image layer 41.

It should be noted that the colors of original texts 411, 412 of original text image 400 shown in FIG. 3 are illustrated to be different from the colors of original texts 411, 412 of document image 4, since the document image 4 includes a color change layer 43 described later.

After the processing at the S12 is performed and then at least the character region layer data is generated, the image processing unit 2 performs a processing at the S13. The processing from the S13-S15 may be performed in parallel to the generation processing of the original text image layer data.

The character recognizing unit 21 performs a character recognition processing on the character region layer data generated at the S 12 (S13). It is possible to utilize a well known optical character reading technique, for implementing the processing at the S11 and S13, i.e., the processing from the extraction of character region till the recognition of character.

In addition, the character recognizing unit 21 generates original text information about the original text (S14).

The "original text information" means herein information about character code, character number, region number, color, font type, font size, position coordinate, position in row, slope and the like for each character recognized at the S13 (see FIG. 9 described later). It should be noted that the character itself instead of character code is written as a "recognition result" in the original text information shown in FIG. 9.

The character number in this embodiment is an identification number generated for each character. The character number is a positive integer, and smaller character number is assigned to a forward word than a backward word in the reading direction.

The region number is an identification number generated for each region to which a character belongs. The region to which a character belongs means a region of paragraph or column to which a character belongs, a page itself to which a character belongs or the like.

The information about color consists of the R-value, G-value, B-value and transparency.

A point is the unit of font size.

The position coordinate is configured with a X-coordinate at the left end position of each character, a Y-coordinate at the top end position of each character, another X-coordinate at the right end position of each character and another Y-coordinate at the bottom end position of each character. Hereinafter, these coordinates are referred to as a left X-coordinate, a top Y-coordinate, a right X-coordinate and a bottom Y-coordinate. A point is also the unit of X-coordinate as well as Y-coordinate, like the unit of font size. The positive direction of X-axis is the reading direction, and the negative direction of Y-axis is the reading direction. In other words, the rightward direction is the positive direction of X-axis and the upward direction is the positive direction of Y-axis.

The information about position in row is for recognizing whether each character is positioned at the head of row, end of row, middle from the head to the end of row, or both the head and the end of row. It should be noted that, when only one character exists in a row, the character is positioned at both the head and the end of row. In the original text information of FIG. 9, the identification number "1" is assigned to the character positioning at the head of row, the identification number "2" is assigned to the character positioning at the end of row, and the identification number "0" is assigned to the character positioning at the middle from the head to the end of row. In the case that only one character exists in a row, the identification number "3" may be assigned to the character.

After the processing at the S14, the deciding unit 25 decides in accordance with the original text information generated at the S14 whether the color of original text satisfies a predetermined condition or not (S15).

Thus, the deciding unit 25 calculates an average value of R-values, an average value of G-values, an average value of B-values and an average value of transparencies for each character included in the original text information, and utilizes these calculated values as a color regarding the original text. Alternatively, the deciding unit 25 may calculate and utilize mode values or the like instead of these average values.

In addition, the deciding unit 25 according to this embodiment decides that the predetermined condition is satisfied when the color regarding the original text is the hard-to-read color.

Thus, the deciding unit 25 compares the R-value, G-value, B-value and transparency regarding the original text with predetermined standard values, or performs a predetermined calculation with the R-value, G-value, B-value and transparency regarding the original text and then compares the calculation results with predetermined standard values. Then, the deciding unit 25 decides in accordance with the comparison results whether the predetermined condition is satisfied or not.

Particularly, the deciding unit 25 decides that the predetermined condition is satisfied when the color regarding the original text is light black or light blue, and decides that the predetermined condition is not satisfied when the color regarding the original text is black or red.

The deciding unit 25 described above serves as the deciding means according to this embodiment of the present invention.

In the case that the deciding unit 25 decides that the color regarding the original text satisfies the predetermined condition (S15: YES), the color regarding the original text is the hard-to-read color. Thus, the color regarding the original text does not make the original text become prominent in the translation priority mode. Therefore, the image processing unit 2 skips processing of following S16-S18 and performs processing after the S19.

In the case that the deciding unit 25 decides that the color regarding the original text does not satisfy the predetermined condition (S15: NO), the color regarding to the original text is the easy-to-read color. Thus, the color regarding the original text makes the original text become prominent in the translation priority mode. Therefore, the image processing unit 2 performs processing of following S16-S18 for changing the color regarding the original text to be the hard-to-read color.

If the color of original text in the original text image layer was directly changed for changing the color regarding the original text to be the hard-to-read color, it may cause a problem that the original text become hardly prominent in the original text priority mode.

Thus, this embodiment utilizes the color change layer. However, it should be noted that the color change layer in this embodiment is a diagram layer.

Figure 6:
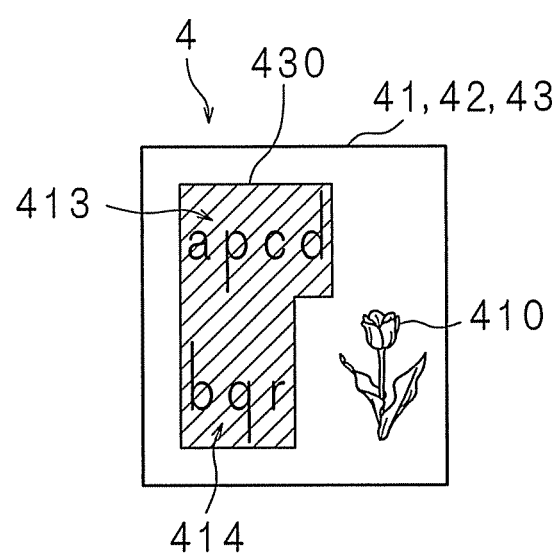
FIG. 6 is a schematic view showing an example of color-change layer generated by the document image generating apparatus according to the embodiment 1 of the present invention.

FIG. 6 is a schematic view showing an example of color change layer 43 generated by the document image generating apparatus 1.

The document image 4 shown in FIG. 6 is a composite of original text image layer 41, translation layer 42 described later and color change layer 43. The translation is omitted in FIG. 6.

The original text image layer 41 shown in FIG. 6 includes the original text 413 configuring a first row, the original text 414 configuring a second row, and the drawing 410. The original text 413 is an English word "apcd" configured with four alphabets, and the original text 414 is an English word "bqr" configured with three alphabets. In the original text image layer 41, the original texts 413, 414 are shown in black.

The color change layer 43 shown in FIG. 6 includes a color-filled diagram 430.

The color-filled diagram 430 is, for example, formed in a polygonal shape and has the same color on the circumference and on the inside of circumference. In other words, the inside of color-filled diagram 430 is filled in the color which shows the circumference.

The color-filled diagram 430 covers whole of the character region, but not the other regions (e.g., a region showing the drawing 410), in the original text image layer 41. In addition, the position of color-filled diagram 430 in the color change layer 43 corresponds to the position of character region (i.e., the position of original texts 413, 414) in the original text image layer 41.

In the case that the lower limit value of transparency is set to be "0" and the top limit value of transparency is set to be "100", the transparency of background is set to be "0" (in short, completely opaque). Then, the color-filled diagram 430 is shown in white (hereinafter, referred to as "transparent white") whose transparency is set to be a predetermined value more than "0" and less than "100". In short, the color-filled diagram 430 has the R-value, G-value and B-value of circumference which are respectively the same as the R-value, G-value and B-value of background, and has the R-value, G-value and B-value of inside which are respectively the same as the R-value, G-value and B-value of background. In addition, the color-filled diagram 430 has the transparency of circumference higher than the transparency of background, and has the transparency of inside higher than the transparency of background.

Thus, a user hardly sees the color-filled diagram 430 in the document image 4.

Furthermore, the original texts 413, 414 present in the document image 4 are penetrating the color-filled diagram 430. Therefore, the original texts 413, 414 in the document image 4 look light black, since the transparent white covers the black.

Similarly, the original texts 411, 412 shown in FIG. 4 also become to look light black, since the original texts 411, 412 are present penetrating the color-filled diagram (not shown).

Alternatively, the color of color-filled diagram 430 may be set independently of the background color. In the alternative case, the color of color-filled diagram 430 may be, for example, transparent light blue, since the color of color-filled diagram 430 is not limited to the transparent white.

In the case that the color regarding the original text 413 is black and the color regarding the original text 414 is light blue in the original text image layer 41, the color-filled diagram 430 may be configured to cover the region of original text 413, but not the regions of original text 414 and drawing 410, in the original text image layer 41.

It is not limited to make the color-filled diagram be set for each entire character region or each word. The color-filled diagram may be set for each predetermined unit into which the translation should be divided (e.g., each character, each paragraph, each column, each character string aligned in the reading direction with the same color, or the like).

As described above, it is possible to change only the color of original text to be lighter color than the original color of original text that is easy-to-read color in the original text image layer, because of utilizing the color change layer and properly setting the shape, size, position of color-filled image. In other words, it is possible to prevent remaining image portions other than such a desired original text (i.e., the original text having hard-to-read color, drawings and the like in the original text image layer) from being changed to have colors lighter than the original colors of remaining image portions.

As shown in FIG. 2 and FIG. 5, the changing unit 26 detects the background color of the original text based on the original text image layer data generated at the S12 (S16), for generating at the S18 described later a color change layer data representing the color change layer.

Then, the changing unit 26 sets the color of color-filled diagram in accordance with the background color detected at the S16, and sets the shape, size, position and the like of color-filled diagram for each predetermined unit in accordance with the original text information generated at the S14 (S17). The "predetermined unit" in the example of FIG. 6 is the entire character region.

Further, the changing unit 26 generates the color change layer data representing the color change layer that includes a diagram like the color-filled diagram set at the S17 (S18). Through the processing at the S18, the color change layer 43 including the color-filled diagram 430 is generated, for example, similarly to the original text image layer 41 shown in FIG. 6.

The changing unit 26 described above serves as the changing means according to this embodiment of the present invention.

In the case that plural color-filled diagrams 430, 430, . . . are included in the color change layer 43, the color-filled diagrams 430, 430, . . . may be arranged separately from each other, in contact with each other or with a partial overlap with each other.

In the case that only the original text priority mode is selected for the document image, the image processing unit 2 does not require performing the processing from the S15 to the S18. In the case that only the translation priority mode is selected for the document image, the image processing unit 2 may perform a processing for directly changing the color of original text in the original text image layer, instead of the processing from the S15 to the S18.

When the deciding unit 25 decides that the color regarding the original text satisfies the predetermined condition (S15: YES), after the processing at the S18 or in parallel with the processing from the S16 to the S17, the translating unit 22 performs a translation processing in accordance with the original text information generated at the S14 (S19).

For example, in the case that the original text information includes single row information configured with characters "g", "e", "n", "e", "r", "a", "t", "e" and "d", the translating unit 22 refers to the dictionary DB 14 and detects that these characters form an English word "generated". Then, the translating unit 22 translates the English word "generated" into Japanese, and generates a Japanese word "生成する". In this example case, the English word "generated" is the original text, and the Japanese word "生成する" is the translation.

In addition, the translating unit 22 generates original text translation information including not only the information of original text but also the information of translation (S20).

The original text translation information includes information similar to the original text information, information indicating the contents of original text, information indicating the contents of translation, and information indicating the relationship between the original text and the translation. The information indicating the relationship between the original text and the translation (see FIG. 11 described later) indicates the relationship between a phrase for the predetermined unit included in the original text (e.g., the English word "generated": hereinafter, referred to as original text phrase) and a translation corresponding to the original text phrase (e.g., the Japanese word "生成する": hereinafter, referred to as translation phrase). The phrase for the predetermined unit herein means, for example, a word, a phrase, a sentence or the like.

After the processing at the S20, the setting unit 23 sets the documentary format of translation in accordance with the original text translation information generated at the S20 (S21), and generates translation formatting information representing the documentary format set for each translation phrase (S22).

The translation formatting information includes information about the color, font type, font size, position coordinate, slope and the like regarding the translation phrase (see FIG. 12 described later).

For example, the font size of Japanese word "生成する" is set in accordance with the font size of English word "generated". Generally, the font size of translation is set to be not more than the font size of original text. In addition, the font size of translation is set to be not less than a predetermined lower limit font size, for improving the readability of translation.

The position coordinate of Japanese word "生成する" is set to be within the interline space under the English word "generated", based on the vertical and horizontal lengths of region corresponding to the English word "generated" (hereinafter, referred to as corresponding interline space).

When the vertical and horizontal lengths of corresponding interline space are not less than the vertical and horizontal lengths of the Japanese word "生成する", the Japanese word "生成する" is arranged inside the corresponding interline space.

On the other hand, when the vertical length of corresponding interline space are less than the vertical length of the Japanese word "生成する", the Japanese word "生成する" is arranged and at least the top portion of each character positions the top portion of the corresponding interline space (i.e., the region showing the English word "generated"). Thus, the top Y-coordinate of character in the translation is set to be between the top Y-coordinate and the bottom Y-coordinate of character in the original text.

In the case that the translation is arranged above the original text, the bottom Y-coordinate of character in the translation is set to be between the top Y-coordinate and the bottom Y-coordinate of the character in the original text.

Similarly, in the case that the translation is arranged at the right (or left) side of vertically written original text, the left (or right) X-coordinate of character in the translation is set to be between the right X-coordinate and the left X-coordinate of character in the original text.

Furthermore, in accordance with the color of English word "generated", two colors are provided for the color of Japanese word "生成する": the color prepared for an original text priority mode; and the color prepared for a translation priority mode. These two colors are selectable in response to operation mode change. Thus, the image processing unit 2 generates a variable prepared from a parameter for selecting the color of character, for example, on the translation layer data generated at the S23 described later. Moreover, the image processing unit 2 associates a switch command with the document image at the S24 described later. The switch command is for assigning a value indicating light blue to the variable when the original text priority mode is selected, and for assigning a value indicating red to the variable when the translation priority mode is selected.

In this embodiment, since the color of English word "generated" is the same as the color of English word "image", the color of Japanese word "生成する" is the same as the color of Japanese word "画像". Alternatively, it may be configured to set the color of Japanese word "生成する" different from the color of Japanese word "画像", even in the case that the color of English word "generated" is the same as the color of English word "image".

Assume the case that the color of English word "generated" is different from the color of English word "image" (e.g., the color of English word "generated" is blue, but the color of English word "image" is green).

When the color regarding translation is set for each word in the assumed case, the color of Japanese word "生成する" is set to be different from the color of Japanese word "画像" (e.g., the color of Japanese word "生成する" is light blue, but the color of Japanese word "画像" is light green in the assumed case).

When the color regarding translation is set for each entire character region in the assumed case, the color of Japanese word "生 成する" is the same as the color of Japanese word "画像" (e.g., the color of Japanese word "生成する" is yellow, and the color of Japanese word "画像" is also yellow in the assumed case).

It should be noted that the color regarding translation may be set for each character, paragraph, column or the like.

The color prepared for the original text priority mode, among the colors regarding translation, is set to be harder read image color than the color regarding to the original text in the original text priority mode (i.e., than the original color of original text; particularly, than the color of original text in the original text image layer). Thus, the setting unit 23 sets the color regarding the translation in accordance with exact the information of color regarding the original text included in the original text translation information.

On the other hand, the color prepared for the translation priority mode is set to be easier read color than the color regarding to the original text in the translation priority mode (i.e., than the post-change color of original text; particularly, than the color of original text penetrating the color change layer in the document image). Thus, the setting unit 23 obtains the post-change color of original text in accordance with the information of color regarding the original text included in the original text translation information and in accordance with the color regarding the color-filled diagram, and then sets the color regarding the translation in accordance with the obtained post-change color.

As described above, the setting unit 23 serves at the S21 as the setting means according to the present invention.

After the processing at the S22, the layer generating unit 24 generates translation layer data representing the translation layer, based on the translation formatting information generated at the S22 (S23). The translation layer includes the translation generated in the documentary format set at the S21. For example, the translation layer 42 shown in FIG. 4 includes translations 421, 422. The translation layer serves as the annotation layer according to this embodiment of the present invention. The layer generating unit 24 serves as the generating means according to this embodiment of the present invention.

After the processing at the S23 is completed and further the processing for generating the color change layer data at the S18 is completed, the compositing unit 27 generates a document image including the color change layer data generated at the S18 and the translation layer data generated at the S23 (S24). In short, the compositing unit 27 composites the original text image layer, the color change layer and the translation layer.

It should be noted that the processing at the S18 is not performed in the case that the deciding unit 25 decides that the color regarding the original text satisfies the predetermined condition (S15: YES). Thus, the compositing unit 27 at the S24 generates a document image including the original text image layer data generated at the S12 and the translation layer data generated at the S23. In short, the compositing unit 27 composites the original text image layer and the translation layer.

Furthermore, the compositing unit 27 at the S24 associates the generated document image with a selection command and a switch command.

The selection command is for selecting one of both the original text priority mode and the translation priority mode. Particularly, the selection command is utilized for performing the processing at the S34 and S40 shown in FIG. 7 described later.

The switch command changes the color regarding the translation to be a hard-to-read color when the original text priority mode is selected, and changes the color regarding the translation to be an easy-to-read color when the translation priority mode is selected. Particularly, the switch command is utilized for performing the processing from the S36 to the S38 shown in FIG. 7 when the original text priority mode is selected, and for performing the processing at the S32 shown in FIG. 7 when the translation priority mode is selected.

The compositing unit 27 described above serves as the compositing means according to the embodiment of the present invention. In addition, the selection command serves as the selecting means according to the embodiment of the present invention and the switch command serves as the replacing means according to the embodiment of the present invention.

After the processing at the S24, the image processing unit 2 completes the image generation processing.

The document image generated at the S24 is sent to the PC 3 as shown in FIG. 1. The PC 3 receives and stores the sent document image in a storing unit (not shown).

A user can handle the instructing unit 34 of PC 3 to input a document display instruction to the PC3 for displaying a desired document image on the displaying unit 32.

The document image according to this embodiment is displayed in the translation priority mode by default.

When a user wants to display the document image in the original text priority mode in the case that the document image is displayed in the translation priority mode, the user can handle the instructing unit 34 to input the instruction indicating the priority of original text into the PC 3. On the other hand, when a user wants to display the document image in the translation priority mode in the case that the document image is displayed in the original text priority mode, the user can handle the instructing unit 34 to input the instruction indicating the priority of translation into the PC 3.

When a user wants to stop displaying the document image, the user can handle the instructing unit 34 to input the instruction indicating the stop of displaying the desired document image on the displaying unit 32, into the PC 3.

Figure 7:
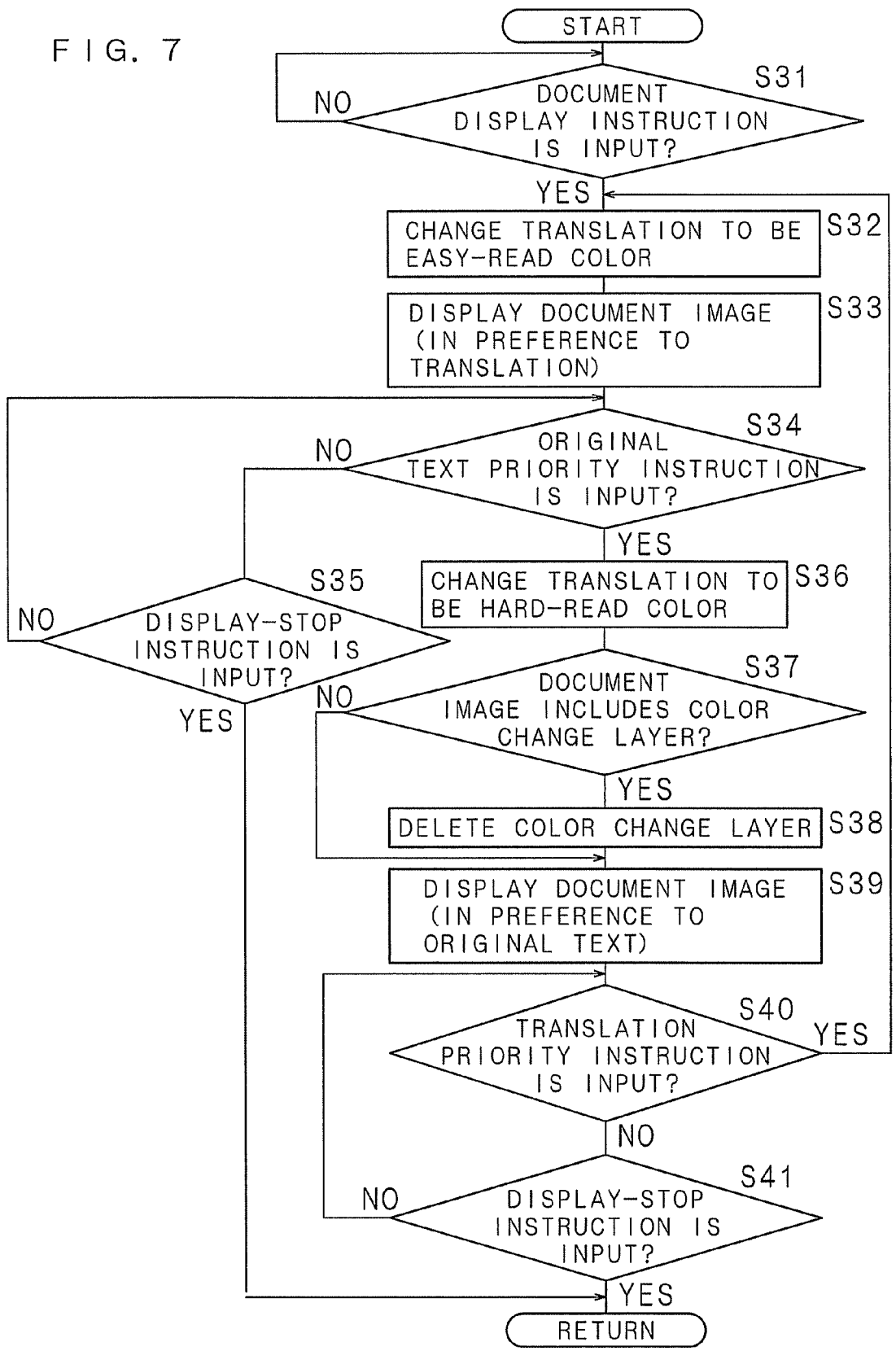
FIG. 7 is a flowchart showing a procedure of document display processing for displaying the document image on a displaying unit.

FIG. 7 is a flowchart showing a procedure of document display processing for displaying the document image on the displaying unit 32. The document display processing is started when at least one document image is received, and is stopped when all of received document images are deleted.

The controlling unit 33 determines whether the document display instruction is input or not (S31). When having determined that the document display instruction is not input yet (S31: NO), the controlling unit 33 repeats the processing at the S31.

When having determined that the document display instruction is input (S31: YES), the controlling unit 33 changes the color regarding the translation in the translation layer data included in the document image to be the easy-to-read color (S32), and then makes the displaying unit 32 display the document image (S33).

After the processing at the S33, the displaying unit 32 displays the document image 4, for example, which includes original texts 411, 412 written in light black and translations 421, 422 written in red as shown in FIG. 4. In other words, the document 4 is displayed in the translation priority mode.

Then, the controlling unit 33 determines whether the instruction indicating the priority of original text is input or not (S34). When having determined that the instruction indicating the priority of original text is not input (S34: NO), the controlling unit 33 determines whether the instruction indicating the stop of displaying is input or not (S35). When having determined that the instruction indicating the stop of displaying is not input (S35: NO), the controlling unit 33 returns the procedure to the processing at the S34. At that time, the displaying unit 32 continuously displays the document image that is displayed at the S33.

When having determined that the instruction indicating the priority of original text is input (S34: YES), the controlling unit 33 changes the color regarding the translation in the translation layer data included in the document image to be the hard-to-read color (S36). Then, the controlling unit 33 determines whether the document image includes the color change layer data or not (S37). When having determined that the document image includes the color change layer data (S37: YES), the controlling unit 33 temporally deletes the color change layer data from the document image (S38).

When having performed the processing at the S38 or when having determined that the document image does not includes the color change layer data (S37: NO), the controlling unit 33 makes the displaying unit 32 display a new document image, instead of displaying the current document image (S39).

After the processing at the S39, the displaying unit 32 displays the document image 4, for example, which includes the original texts 411, 412 written in black and the translations 421, 422 written in light blue (see FIG. 4). In other words, the document image 4 is displayed in the original text priority mode.

Then, the controlling unit 33 determines whether the instruction indicating the priority of translation is input or not (S40). When having determined that the instruction indicating the priority of translation is not input (S40: NO), the controlling unit 33 determines whether the instruction indicating the stop of displaying is input or not (S41). When having determined that the instruction indicating the stop of displaying is not input (S41; NO), the controlling unit 33 returns the procedure to the processing at the S40. At that time, the displaying unit 32 continuously displays the document image that is displayed at the S39.

When having determined that the instruction indicating the priority of translation is input (540: YES), the controlling unit 33 returns the procedure to the processing at the S32. Thus, when the processing at the S33 has been performed, the displaying unit 32 displays the document image 4 again which includes original texts 411, 412 written in light black and the translations 421, 422 written in red as shown in FIG. 4.

When having determined that the instruction indicating the stop of displaying is not input (S35: YES; or S41: YES), the controlling unit 33 returns the procedure to the processing at the S31.

Figure 8A:
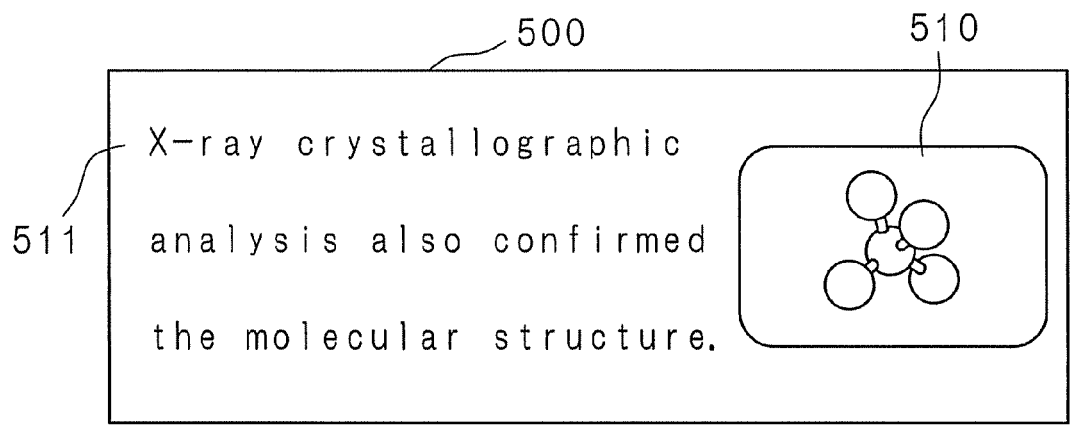
FIG. 8A and FIG. 8B are schematic views showing other examples of original text image and document image.
Figure 8B:
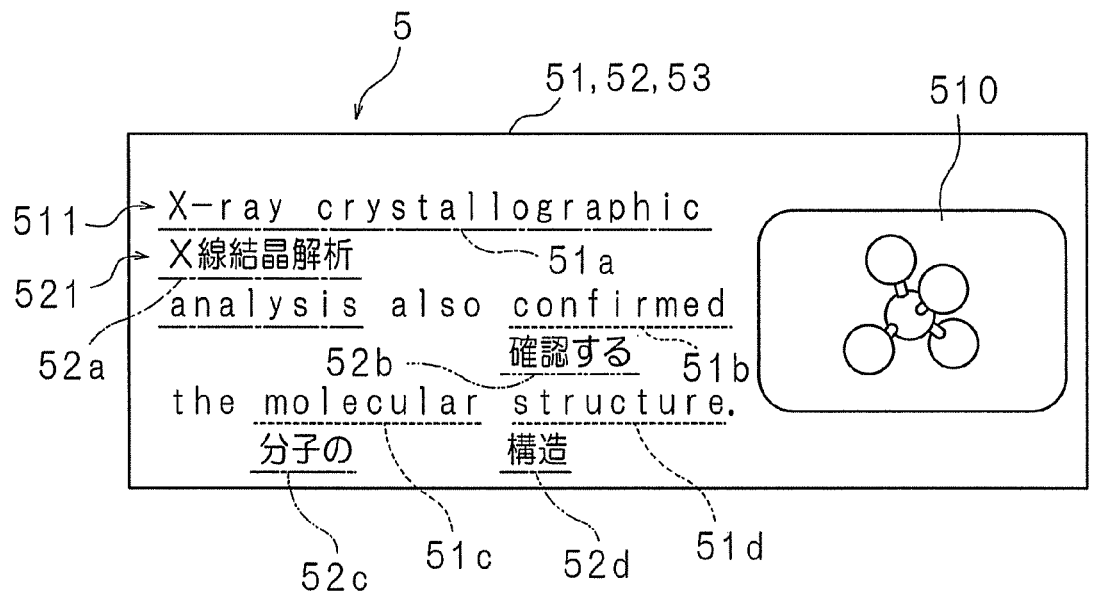

FIG. 8A and FIG. 8B are schematic views showing other examples of original text image and document image.

FIG. 8A and FIG. 8B shows an original text image 500 and a document image 5 that are different from the original text image 400 and the document image 4 shown in FIG. 3A, FIG. 3B, FIG. 4A and FIG. 4B. The document image 5 is an example of annotation-added document image according to this embodiment of the present invention, and a document represented by the document image 5 is an example of annotation-added document according to this embodiment of the present invention.

The original text image 500 shown in FIG. 8A represents a document in which an original text 511 is horizontally written in black on the white background and a drawing 510 is drawn at the right side of original text 511. The original text 511 is an English sentence "X-ray crystallographic analysis also confirmed the molecular structure." that extends over three rows. Particularly, the original text 511 is configured with a phrase "X-ray crystallographic" at the first row, a line break at the end of first row, a phrase "analysis also confirmed" at the second row, a line break at the end of second row, and a phrase "the molecular structure." at the third row.

This embodiment is explained in the context of Japanese phrases, each of which corresponds to each word or phrase included in such an English sentence and is written as ruby characters placed together with the corresponding word or phrase.

The document image 5 shown in FIG. 8B is generated by the image processing unit 2 based on the original text image 500, and is a composite of original text image layer 51, translation layer 52 and color change layer 53. It should be noted that the color-filled diagram included in the color change layer 53 is omitted in the figure.

Similar to the original text image 500 shown in FIG. 8A, the document image 5 represents a document in which the original text 511 is horizontally written on the white background and the drawing 510 is drawn at the right side of original text 511. In the document represented by the document image 5, the translation 521 written in red is arranged in the interline space of original text 511 written in light black.

Particularly, the original text 511 includes original text phrases 51*a*, 51*b*, 51*c*, 51*d*, and the translation 521 includes translation phrases 52*a*, 52*b*, 52*c*, 52*d*. In addition, the translation phrases 52a, 52b, 52c, 52d are respectively arranged in the corresponding interline spaces of original text phrases 51a, Kb, 51c, 51d.

The original text phrase 51a is "X-ray crystallographic analysis", the original text phrase 51b is "confirmed", the original text phrase 51c is "molecular" and the original text phrase 51d is "structure".

The translation phrase 52a is "X線結晶解析", the translation phrase 52b is "確認する", the translation phrase 52c is "分子の" and the translation phrase 52d is "構造".

Original text information regarding the original text image 500 is obtained, after the character extracting unit 20 performs the character region extraction processing at the S11 and the generation processing of character region layer and original text image layer at the S12 and then the character recognizing unit 21 performs the character recognition processing at the S13 and the original text information generation processing at the S14.

FIG. 9 is a schematic view for explaining original text information generated by the document image generating apparatus 1. FIG. 9 shows a part of original text information regarding the original text image 500.

For example, FIG. 9 shows a character number, a left-X coordinate, a top-Y coordinate, a right-X coordinate, a bottom-Y coordinate, a region number, a position in row and a font size, for each character obtained through the character recognition result. It is not shown in FIG. 9 about a color, a font type, a slope and the like for each character obtained through the character recognition result, for explanation purpose.

In FIG. 9, the unit for the position coordinate, as well as the font size, is a point. However, when a recognized character is a single-byte alphanumeric character, the font size of recognized character becomes the half of font size shown in FIG. 9.

Although FIG. 9 illustrates recognized characters "X", "-", "r", "a", "y", . . . , "a", "n", "a", "l", "y", "s", "i", "s" whose characters numbers are from 2617 to 2646, those recognized characters are first to thirtieth characters included in the original text 511.

Although there is a blank (" ") as the recognized character whose character number is 2622, this blank means a space character put between the English word "X-ray" and the English word "crystallographic".

Normally, such a space character should be put between the English word "crystallographic" and the English word "analysis". However, the English word "crystallographic" positions at the end of first row and the English word "analysis" positions at the head of second row in the original text 511. Thus, the space character should not be put between the English word "crystallographic" and the English word "analysis". Hence, there is no space character between the row end character "c" whose character number is 2638 and the row head character "a" whose character number is 2639, in FIG. 9.

The translating unit 22 performs the translation processing at the S19 based on the original text information as shown in FIG. 9.

Firstly, the translating unit 22 refers information regarding the position in row, and forms a character string in which recognized characters are aligned from the row head of row to the row end. In the case of original text 511 shown in FIG. 8, the translating unit 22 forms a first character string "X-ray crystallographic", a second character string "analysis also confirmed" and a third character string "the molecular structure.".

Secondary, the translating unit 22 performs a natural language processing on the formed character strings, such as a morphological analysis, a local syntax analysis, and a part of speech estimation. Thus, it is possible to identify a word included in the character strings, as well as a phrase configured with plural words included in the character strings.

Then, the translating unit 22 selects a word and a phrase to be translated into Japanese, among the identified words and phrases.

For example, the Japanese translation of English word "also" is well known (i.e., it is easy for a user to translate the English word "also" into Japanese word). Thus, the English word "also" is not translated into Japanese word. In addition, the English word "the", the space character " " and a period mark "." do not have prominent meaning. Thus, these are not translated into Japanese.

Then, the translating unit 22 translates the selected word and phrase into Japanese. When there are many Japanese translations applicable to the selected word or phrase, the translating unit 22 may determine the best translation based on a translation of word or phrase positioned front or back of the word or phrase to be translated.

FIG. 10A and FIG. 10B are schematic views for explaining an adjustment processing of character string. And, FIG. 11A and FIG. 11B are schematic views for explaining original text translation information generated by the document image generating apparatus 1. FIG. 11 shows a relationship between the original text phrase and the translation phrase. FIG. 10A corresponds to FIG. 11A, and FIG. 10B corresponds to FIG. 11B.

FIG. 10A illustrates the first character string "X-ray crystallographic", the second character string "analysis also confirmed" and the third character string "the molecular structure." (see FIG. 8).

From these first to third character strings, the words and phrases to be translated are selected as shown in the column "original text phrase" illustrated in FIG. 11A. In this embodiment, the word "X-ray" and the word "crystallographic" are selected from the first character string, the word "analysis" and the word "confirmed" are selected from the second character string, and the word "molecular" and the word "structure" are selected from the third character string.

When these selected words are translated into Japanese, the following Japanese phrases are obtained as illustrated in the column "translation phrase" shown in FIG. 11A. The Japanese phrase "X線" is obtained from the translation of "X-ray", the Japanese phrase "結晶学の" is obtained from the translation of "crystallographic", and Japanese phrase "分析" is obtained from the translation of "analysis". Similarly, the Japanese phrase "確認する" is obtained from the translation of "confirmed", the Japanese phrase "分子の" is obtained from the translation of "molecular", and Japanese phrase "構造" obtained from the translation of "structure".

However, the Japanese phrase "X線結晶解析" is obtained from the translation of English phrase "X-ray crystallographic analysis", though the original text 511 includes the phrase "X-ray crystallographic analysis" configured with the words "X-ray", "crystallographic", and "analysis".

In short, it may cause a mistranslation if the translation processing were performed with directly utilizing the first character string, the second character string and the third character string as shown in FIG. 10A.

For preventing a mistranslation, the translating unit 22 according to this embodiment performs a line break feeding processing, in order to form a proper character string based on the original text information.

The line break feeding processing serves to connect a phrase before a line break (the end of first row and the end of second row in the case of original text 511) of original text with a phrase after the line break. In the case that such an original text is written in English, the space character is inserted into the position of post-connected original text corresponding to the position of line break.

Particularly, the translating unit 22 forms a character string (hereinafter, referred to as post-connected character string) in which the first character string "X-ray crystallographic", the space character, the second character string "analysis also confirmed", the space character, the character string "the molecular structure." and the space character are aligned in this order, in the case of original text 511. FIG. 10B illustrates such a post-connected character string "X-ray crystallographic analysis also confirmed the molecular structure." obtained at that time. Arrows in FIG. 10B are added for emphasizing the input space characters.

The original text translation information includes information about the post-connected character string regarding to the original text 511 and line break position information representing the line break positions of original text 511. For example, the translating unit 22 generates identification numbers for the first to third character strings, associates the generated identification information with the input position of character space in the post-connected character string, and utilizes such an associated thing as the line break position information. It is easy to re-form the first to third character strings, due to the post-connected character string and the line break position information, at the processing described later.

The space characters are inserted between the first character string and the second character string, and between the second character string and the third character string. The reason is that the line break position is normally the boundary between one word and another word in English. It is not required for inputting the space character in Japanese.

In the case that the original text 511 includes plural sentences, the translating unit 22 generates the post-connected character string including all of the plural sentences.

When the translation processing is performed in accordance with this pos-connected character string, the following word and phrase are selected which are illustrated in the column "original text phrase" shown in FIG. 11B. The phrase "X-ray crystallographic analysis" is selected, and the words "confirmed", "molecular", "structure" are selected. In short, the original text phrases 51a, 51b, 51c, 51d are selected.

When these selected word and phrase are translated into Japanese, the following Japanese phrases are obtained which are illustrated in the column "translation phrase" shown in FIG. 11B. The Japanese phrase "X線結晶解析" is obtained from the translation of "X-ray crystallographic analysis", the Japanese phrase "確認する" is obtained from the translation of "confirmed", the Japanese phrase "分子の" is obtained from the translation of "molecular", and the Japanese phrase "構造" is obtained from the translation of "structure". Thus, the translation phrases 52a, 52b, 52c, 52d are obtained.

In other words, it is possible to prevent the mistranslation because the pos-connected character string is generated as shown in FIG. 10B.

After obtaining the relationship between the original text and the translation described above, the translating unit 22 generates the original text translation information at the S20.

Then, the setting unit 23 sets the documentary format for the translation at the S21, and generates the translation formatting information at the S22.

Figure 12:
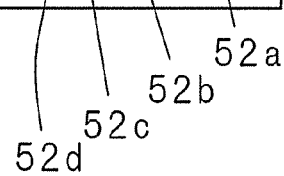
FIG. 12 is a schematic view for explaining translation formatting information generated by the document image generating apparatus according to the embodiment 1 of the present invention.

FIG. 12 is a schematic view for explaining translation formatting information generated by the document image generating apparatus 1.

FIG. 12 illustrates translation formatting information representing the documentary formats set for translation phrases 52a, 52b, 52c, 52d. The translation formatting information is generated in accordance with the original text translation information as shown in FIG. 11B. Based on the generated translation formatting information, the layer generating unit 24 generates the translation layer 52 shown in FIG. 8B at the S23.

The translation formatting information utilizes data extending over plural rows (four rows in the case of FIG. 12) for representing a documentary format of single translation phrase (e.g., translation phrase 52a). One or more parameters representing the documentary format are aligned in each row of translation formatting information, and a row end character identifying each row is aligned at the end of each row.

A real number with six decimal places is arranged, as a parameter, in a row including a row end character Tz. This parameter represents a multiplication rate (%) for the horizontal length of recognized character. It should be noted that the row including the row end character Tz can be omitted. At that omitted case, the multiplication rate (%) for the horizontal length of recognized character becomes a predetermined value (e.g., 100.000000).

Six real numbers, each of which is provided with four decimal places, are aligned at the head side, and two real numbers, each of which is provided with two decimal places, are aligned at the end side as parameters in a row including a row end character Tm. The first to fourth parameters represent slopes of translation phrases (i.e., rotation). In the case that the rotation angle of translation phrase is a counterclockwise angle θ, the first parameter represents the "cos θ", the second parameter represents the "sin θ", the third parameter represents the "− sin θ" and the fourth parameter represents the "cos θ". The fifth parameter represents the left X coordinate and the sixth parameter represents the bottom Y coordinate.

One character string is aligned at the head side, and one real number with one decimal place, is aligned at the end side as parameters in a row including a row end character Tf. The first parameter represents a label of font name indicating the font type of translation phrase. The first parameter "/FJH" shown in the figure means "Shift JIS, MS Gothic, and horizontally written". The second parameter represents the font size of translation phrase.

Generally, the font type of translation phrase is the same as the font type of original text phrase.

Three real numbers, each of which is provided with one decimal place, are aligned as parameters in a row including a row end character Rg. The first to third parameters represent the R-values, G-values, and B-values of colors regarding the translation phrases, respectively. The first to third parameters "1.0 0.0 0.0" in the figure represent red colors.

One hexadecimal value is arranged as a parameter between a single-byte mark "<" and another single-byte mark ">" in a row including a row end character Tj. This parameter represents the character code of character included in the translation phrase. For example, a parameter "<827790fc8c8b8fbb89f090cd>" represents a character string "X線結晶解析".

As shown in FIG. 8B, the original text phrase 51a is configured with three words. However, the original text phrase 51a extends over the first and second rows. Furthermore, the translation phrase 52a corresponding to the original text phrase 51a is arranged at the interline space under the first row. Thus, it may be difficult for a user looking at the document image 5, to understand the relationship between the original text phrase 51a and the translation phrase 52a.

Therefore, it is considered to add an underline into the original text phrase 51a. The added underline is included in the translation layer 52.

In the case that the original text phrase should be emphasized by the underline, the setting unit 23 may generate information representing the documentary format of underline, and the layer generating unit 24 may make the translation layer data include the generated information about the underline.

It is possible to utilize a configuration in which all original text phrases are respectively underlined, in order to distinguish the original text phrase provided with the translation phrase from the original text phrase provided with no translation phrase.

It will be described below about a procedure to arrange the translation phrase in the corresponding interline space.

Hereinafter, a "n"-th original text phrase (n: natural number) is referred to as an original text phrase [n], a "n+1"-th original text next to the original text phrase [n] is referred to as an original text phrase [n+1], and a "n−1"-th original text prior to the original text phrase [n] is referred to as an original text phrase [n−1]. For example, when the original text phrase 51a is the original text phrase [n], the original text phrase 51b is the original text phrase [n+1]. Similarly, when the original text phrase 51b is the original text phrase [n], the original text phrase 51c is the original text phrase [n+1]. In addition, the "[n−1]" is attached on something corresponding to the original text phrase [n−1], the "[n]" is attached on something corresponding to the original text phrase [n], and the "[n+1]" is attached on something corresponding to the original text phrase [n+1].

The setting unit 23 firstly detects the number of order in the post-connected character string about the head character of original text phrase [n], and detects the number of order in the post-connected character string about the end character of original text phrase [n], in accordance with information, among the original text translation information, representing relationships between the post-connected character string shown in FIG. 10B, the original text phrase shown in FIG. 11B and the translation phrase shown in FIG. 11B. The setting unit 23 similarly detects such numbers for the original text phrase [n+1].

Furthermore, the setting unit 23 performs calculation and determines that the head character of original text phrase [n] is the "C"-th character in the "L"-th row (L and C: natural number no less than "0"), in accordance with the line break position information included in the original text translation information. Similarly, the end character of original text phrase [n] is also calculated and determined. Moreover, the setting unit 23 similarly calculates and determines for the original text phrase [n+1].

Particularly, the head character of original text phrase 51a is the 0th character in the 0th row, and the end character of original text phrase 51a is the 7th character in the 1st row. The head character of original text phrase 51b is the 14th character in the 1st row, and the end character of original text phrase 51b is the 22th character in the 1st row. The head character of original text phrase 51c is the 4th character in the 2nd row, and the end character of original text phrase 51c is the 12th character in the 2nd row.

Then, the setting unit 23 sets the left X coordinate of head character in the original text phrase [n] as the left X coordinate of corresponding interline space [n] (i.e., the start X coordinate of corresponding interline space [n]). Similarly, the setting unit 23 sets for the left X coordinate of corresponding interline space [n+1].

Further, the setting unit 23 determines whether the end character of original text phrase [n] is aligned in the same row as the head character of original text phrase [n+1] or not.

When the end character of original text phrase [n] is aligned in the same row as the head character of original text phrase [n+1] as in the case of original text phrases 51a, 51b, the setting unit 23 sets the right X coordinate of corresponding interline space [n] (i.e., the ending X coordinate of corresponding interline space [n]) to be a X-coordinate in which a predetermined value is subtracted from the left X coordinate of corresponding interline space [n+1]. The X coordinate in which a predetermined value is subtracted from the left X coordinate of corresponding interline space [n+1] represents a position shifted leftward by the predetermined value from the left X coordinate of corresponding interline space [n+1]. For example, the predetermined value may be equal to half of font size regarding the original text phrase [n].

On the other hand, when the end character of original text phrase [n] is not aligned in the same row as the head character of original text phrase [n+1] as in the case of original text phrases 51b, 51c, the setting unit 23 identifies the row end character in the row including the end character of original text phrase [n], and sets the right X coordinate of corresponding interline space [n] to be the right X coordinate of the identified character.

When the start and the ending of corresponding interline space [n] are calculated as described above in the case of original text phrase 51a, it is possible to utilize the corresponding interline space covering almost from the 0th character in the 0th row to the 13th character in the 1st row. Thus, the corresponding interline space [n] has an enough horizontal length [n] described later.

When the original text phrase 51a is underlined as described above, a user will not misunderstand that the translation phrase 52a includes a translation of English word "also", even in the case that the translation phrase 52a includes so many characters and the end character of translation phrase 52a is aligned under the English word "also" that is not included in the original text phrase 51a.

In the case that there is a word/phrase provided with no translation between the original text phrase [n] and the original text phrase [n+1] (e.g., the English word "also" arranged between the original text phrase 51a and the original text phrase 51b), the setting unit 23 may set the ending X coordinate of corresponding interline space [n] to be a X coordinate in which a predetermined value is subtracted from the left X coordinate of this word/phrase.

The start X coordinate of corresponding interline space [n] is utilized as the start X coordinate of translation phrase [n]. In addition, the ending X coordinate of corresponding interline space [n] is utilized as the upper limit of ending X coordinate of translation phrase [n].

After setting the start X coordinate and the ending X coordinate of corresponding interline space [n], the setting unit 23 calculates the horizontal length [n] of corresponding interline space [n].

When the head character of original text phrase [n] is aligned at that time in the same row as the end character of original text phrase [n] as in the case of original text phrase 51b, the setting unit 23 subtracts the start X coordinate of corresponding interline space [n] from the ending X coordinate of corresponding interline space [n], in order to obtain the horizontal length [n].

On the other hand, when the head character of original text phrase [n] is not aligned in the same row as the end character of original text phrase [n] as in the case of original text phrase 51*a*, the setting unit 23 subtracts start X coordinate of corresponding interline space [n] from the right X coordinate of the row end character, subtracts the left X coordinate of row head character from the ending X coordinate of corresponding interline space [n], and adds two of subtraction results, in order to obtain the horizontal length [n].

It will be described below about an example in the context of original text phrase [n] whose head character and end character are aligned in the same "L"-th row.

The setting unit 23 tries to set the font size regarding translation phrase [n]. For setting the font size, the setting unit 23 firstly detects the Y coordinate of "L"-th row and the Y coordinate of "L+1"-th row. The "L"-th row is an average value of bottom Y coordinates of characters arranged in the "L"-th row, and the "L+1"-th row is an average value of bottom Y coordinates of characters arranged in the "L+1"-th row.

Then, the setting unit 23 calculates the vertical length [n] of corresponding interline space [n].

The vertical length [n] is the Y coordinate of "L"-th row minus the Y coordinate of "L+1"-th row further minus the font size of character aligned in the "L+1"-th row. Therefore, the longer (or shorter) vertical length [n] leads the wider (or narrower) corresponding interline space [n].

Furthermore, the setting unit 23 compares a lower limit font size, a upper limit font size and the vertical length [n] of corresponding interline space [n]. The lower limit font size is the font size regarding original text phrase [n] multiplied by a predetermined lower limit rate (e.g., 40%). The upper limit font size is the font size of original text phrase [n] multiplied by a predetermined upper limit rate (e.g., 80%). The predetermine lower limit rate and the predetermined upper limit rate are previously set in consideration of the readability of translation phrase.

When the vertical length [n] is not less than the lower limit font size and not more than the upper limit font size, the setting unit 23 sets the font size regarding the translation phrase [n] to be the vertical length [n] of corresponding interline space [n].

On the other hand, when the vertical length [n] is less than the lower limit font size, the setting unit 23 sets the font size regarding the translation phrase [n] to be the lower limit font size. When the vertical length [n] is more than the upper limit font size, the setting unit 23 sets the font size regarding the translation phrase [n] to be the upper limit font size.

As described above, the font size regarding the translation phrase [n] is obtained in accordance with the vertical length [n] of corresponding interline space [n] and the font size of original text phrase [n]. Therefore, it is possible to prevent the font size of original text phrase [n] and the font size of translation phrase [n] from diverging too much to each other, even in the case that some deformation occurs in the original image.

Next, the setting unit 23 tries to set the horizontal multiplication rate (i.e., the parameter in the row including the row end character Tz shown in FIG. 12) regarding the original text phrase [n].

For setting the horizontal multiplication rate, the setting unit 23 multiplies the font size regarding translation phrase [n] by the number of characters included in the translation phrase [n], and determines whether the multiplication result is more than the horizontal length [n] of corresponding interline space [n] or not.

When having determined that the multiplication result is not more than the horizontal length [n] of corresponding interline space [n], the setting unit 23 sets the horizontal multiplication rate to be 100%.

When having determined that the multiplication result is more than the horizontal length [n] of corresponding interline space [n], the setting unit 23 divides the horizontal length [n] by the multiplication result and "100", and sets the horizontal multiplication rate to be the divided result. Thus, the horizontal multiplication rate becomes less than 100% at that time.

In the case that the horizontal multiplication rate is set to be less than 100%, each of characters included in the translation phrase [n] is horizontally compressed. Thus, the smaller horizontal multiplication rate leads the harder readability of translation phrase [n].

Hence, the setting unit 23 determines whether the horizontal multiplication rate is less than a predetermine rate (e.g., 100%) or not. When having determined that the horizontal multiplication rate is less than the predetermine rate, the setting unit 23 determines whether it is possible to stretch the corresponding interline space [n] toward the reading direction of original text phrase [n] or not. When the setting unit 23 has determined that it is possible to stretch the corresponding interline space [n] toward the reading direction of original text phrase [n], the corresponding interline space [n] is stretched horizontally because the text is horizontally written in this embodiment. In the case that the text is vertically written, the corresponding interline space [n] is stretched vertically.

At that time, the setting unit 23 calculates a length from the ending X coordinate of corresponding interline space [n] to the left X coordinate of head character in the translation phrase [n+1], and determines that it is possible to stretch the corresponding interline space [n] rightward in the case that the calculated length is not less than a predetermined length. Then, the setting unit 23 stretches the ending X coordinate of corresponding interline space [n] to be the left X coordinate of head character minus a predetermined value.

In the case that the calculated length is less than the predetermined length, the setting unit 23 calculates a length from the start X coordinate of corresponding interline space [n] to the right X coordinate of end character in the translation phrase [n−1], and determines it is possible to stretch the corresponding interline space [n] leftward in the case that the calculated length is not less than a predetermined length. Then, the setting unit 23 stretches the start X coordinate of corresponding interline space [n] to be the right X coordinate of end character in the translation phrase [n−1] plus a predetermined value.

After stretching the corresponding interline space [n] as described above, the setting unit 23 calculates the post-stretched horizontal length [n] and calculates the horizontal multiplication rate [n] based on the calculated post-stretched horizontal length [n].

In the case that there is at least one word between the original text phrase [n−1] and the original text phrase [n], the start X coordinate of corresponding interline space [n] may be stretched to the right X coordinate of head character (or center character) in the word aligned at the left side of original text phrase [n] plus a predetermined value. Thus, a user can easily understand the relationship between the original text phrase [n] and the translation phrase [n].

Finally, it will be described about a procedure to calculate a Y coordinate Tm_j_y [n] that corresponds to the left-bottom end of translation phrase [n]. For this procedure, the setting unit 23 previously calculates the Y coordinate corresponding to the left-bottom end of original text phrase [n]. The Y coordinate corresponding to the left-bottom end of original text phrase [n] may be a Y coordinate ye_L[n] or a Y coordinate ye_W[n] described below.

The explanation is described below in the context of calculating the Y coordinate ye_L[n] corresponding to the left-bottom end of original text phrase [n] for each row consisting of the original text, in consideration of the slope of row consisting of the original text.

The setting unit 23 utilizes an equation (1) described below, in order to calculate the horizontal length (linewidth [L]) of original text at the "L"-th row. In the equation (1), a Tf_e[L] represents the font size, a plainlen[L] represents the number of characters, a Tc_e [L] represents the character gap, and a Tz_e [L] represents the horizontal multiplication rate, regarding the original text at the "L"-th row.

$$\text{linewidth}[L] = \{(Tf\_e[L] + Tc\_e[L]) \times \text{plainlen}[L]/2 - Tc\_e[L]/2\} \times (Tz\_e[L]/100) \quad (1)$$

Then, the setting unit 23 calculates the ye_average[L] that represents the bottom Y coordinate of original text at the "L"th row and is an average value of bottom Y coordinates of characters aligned in the "L"-th row.

Furthermore, the setting unit 23 calculates the ye_0[L] that is the left end Y coordinate of original text at the "L"-th row, in consideration of the slope of original text at the "L"-th row. Thus, the setting unit 23 treats the ye_average[L] that is the bottom Y coordinate of original text at the "L"-th row, as the bottom Y coordinate of original text center at "L"-th row. Particularly, the setting unit 23 utilizes an equation (2) described below, in order to calculate a ye_0[L] representing a Y coordinate. In the equation (2), a Tm_sin_e[L] represents the slope coefficient of original text at the "L"-th row (=sin θ).

$$ye\_0[L] = ye\_\text{average}[L] - (\text{linewidth}[L]/2) \times Tm\_\sin\_e[L] \quad (2)$$

Next, the setting unit 23 utilizes an equation (3) described below, in order to calculate a ye_L[n] that represents a Y coordinate corresponding to the left bottom of original text phrase [n]. In the equation (3), a Tm_j_x[n] represents the left X coordinate of original text phrase [n], and a xj_0 [L] represents the left X coordinate of original text.

$$ye\_L[n] = ye\_0[L] + (Tm\_j\_x[n] - xj\_0[L]) \times Tm\_\sin\_e[L] \quad (3)$$

The "Tm_j_x[n]-xj_0 [L]" represents a relative X coordinate of original text phrase [n] to the original text at the "L"-th row. In addition, the "(Tm_j_x[n]-xj_0[L])×Tm_sin_e[L]" represents a displacement for Y-axis direction of the left bottom end of original text phrase [n] from the left bottom of original text at the "L"-th row.

Next, the explanation is described below in the context of calculating the Y coordinate ye_W[n] corresponding to the left-bottom end of original text phrase [n] for each original text phrase, in consideration of the slope of row consisting of the original text.

The setting unit 23 utilizes an equation (4) described below, in order to calculate a w_width[n] that represents the horizontal length of original text phrase [n]. In the equation (4), a Tf_e[n] represents the font size, a plainlen[n] represents a number of characters, a Tc_e[n] represents the character gap and a Tz_e[n] represents the horizontal multiplication rate, regarding the original text phrase [n].

$$w\_\text{width}[n] = \{(Tf\_e[n] + Tc\_e[n]) \times \text{plainlen}[n]/2 - Tc\_e[n]/2\} \times (Tz\_e[n]/100) \quad (4)$$

Next, the setting unit 23 calculates a ye_average_w[n] that represents the bottom Y coordinate of original text phrase [n] and is an average value of bottom Y coordinates of characters included in the original text phrase [n].

Furthermore, the setting unit 23 calculates a ye_W[n] that represents a Y coordinate corresponding to the left bottom end of original text phrase [n], in consideration of the slope of row. For calculating the ye_W[n], the setting unit 23 treats a ye_average_w[n] representing a bottom Y coordinate of original text phrase, as a bottom Y coordinate of original text phrase [n] center. Particularly, the setting unit 23 utilizes an equation (5) described below, in order to calculate the Y coordinate, i.e., ye_W[n]. In the equation (5), a Tm_sin_e[n] represents the slope coefficient of original text at the "L"-th row (=sin θ).

$$ye\_W[n] = ye\_\text{average}\_w[n] - (w\_\text{width}[n]/2) \times Tm\_\sin\_e[n] \quad (5)$$

It may be configured that the setting unit 23 calculates the Y coordinate ye_L[n] with the equation (3) or the Y coordinate ye_W[n] with the equation (5). Alternatively, it may be configured that the setting unit 23 calculates both the ye_L[n] and ye_W[n], compares the calculated ye_L[n] with the calculated ye_W[n], and selects one of both in accordance with the comparison result. It will be described below about the latter alternative case.

After calculating both the ye_L[n] and ye_W[n] with the equations (3) and (5), the setting unit 23 compares the ye_L [n] with the ye_W[n]. When the ye_L[n] is close to the ye_W [n] (e.g., the absolute difference value of both is not more than 40% of font size Tf_e[n] regarding the original text phrase [n]), the setting unit 23 selects the ye_W[n]. On the other hand, when the ye_L[n] is far from the ye_W[n] (e.g., the absolute difference value of both is more than 40% of font size Tf_e[n] regarding the original text phrase [n]), the setting unit 23 selects the ye_L[n].

Then, the setting unit 23 sets the yj[n] representing the Y coordinate corresponding to the left top end of translation phrase [n] to be the selected ye_W[n] or ye_L[n]. In other words, the yj[n] is set to match the left bottom end of original text phrase [n] and the left top end of translation phrase [n], in this embodiment.

The setting unit 23 may add a proper small value (e.g., 1.5 point) to the selected ye_W[n] or ye_L[n], and substitute the added ye_W[n] or ye_L[n] into the yj[n]. At that time, the top portion of translation phrase [n] slightly covers the bottom portion of original text phrase [n]. Therefore, it is possible to show the relationship between the original text phrase [n] and the translation phrase [n], more clearly, without spoiling the readabilities of original text phrase [n] and translation phrase [n]

The displacement of Tm_j_y[n] representing the Y coordinate corresponding the left bottom end of translation phrase [n] from the yj[n] representing the Y coordinate corresponding the left top end of translation phrase [n] is equal to the Tf_j[n] representing the font size of translation phrase [n]. Therefore, the setting unit 23 subtracts the Tf_j[n] from the yj[n] to obtain the Tm_j_y[n].

In the case that the obtained Tm_j_y[n] is not more than the ye_average_upper[L+1] representing the upper Y coordinate of original text at the "L+1"-th row, the translation phrase [n] covers the original text at the "L+1"-th row because the inter-line space [n] is narrow. It is preferred to put at least blank consisting of a predetermined interval (int: e.g., 1.5 point) between the bottom end of translation phrase [n] and the top end of original text at the "L+1"-th row.

Thus, the setting unit 23 compares the obtained Tm_j_y[n] with the ye_average_upper[L+1]. In the case of "{Tm_j_y [n]+int}≧ye_average_upper[L+1]", the setting unit 23 utilizes the obtained Tm_j_y[n]. In the case of "{Tm_j_y[n]+int}>ye_average_upper[L+1]", the setting unit 23 utilizes an equation (6) described below, in order to re-calculate the Tm_j_y[n].

$$Tm\_j\_y[n] = ye\_\text{average\_upper}[L+1] + int \qquad (6)$$

Thus, the yj[n] representing the Y coordinate corresponding to the left top end of translation phrase [n] becomes the Tm_j_y[n] calculated with the equation (6) plus the Tf_j[n] representing the font size of translation phrase [n]. In other words, the left top end of translation phrase [n] is shifted upward.

As described above, the document image generating apparatus 1 can improve the readabilities of both original texts 411, 412 in the document image 4 with keeping the layout regarding the original text image 400, as shown in FIG. 3 and FIG. 4, for example.

For the document image 4, it may be provided with an original text image reviewing mode for reviewing the original text image 400, in addition to the original text image priority mode and translation priority mode. In the original text image reviewing mode, the displaying nit 32 displays the document image 4 in which the translation layer 42 and color change layer 43 are temporally removed.

Embodiment 2

Figure 13:
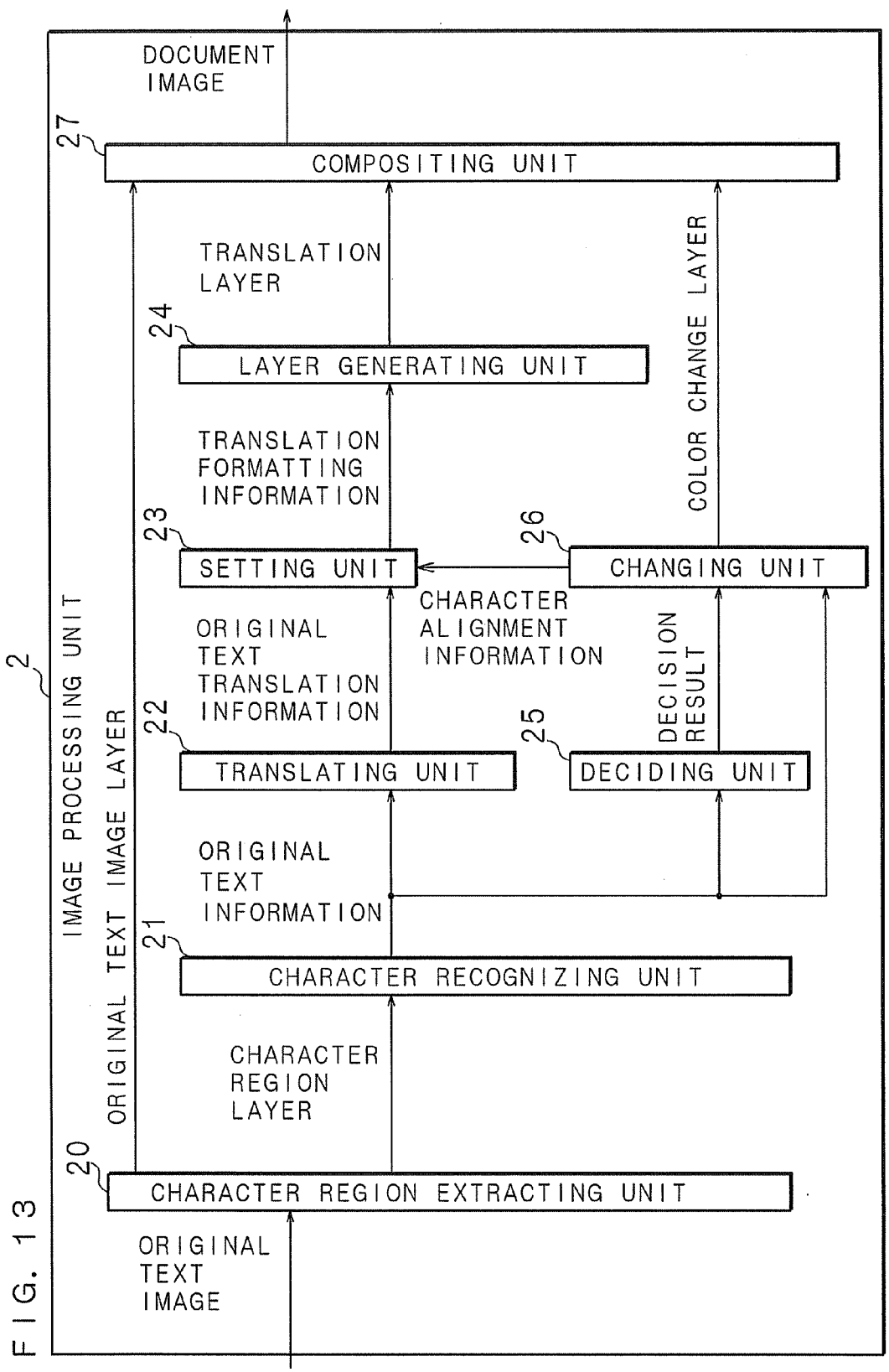
FIG. 13 is a functional block diagram for explaining a procedure performed by the document image generating apparatus according to an embodiment 2 of the present invention to generate the document image.

FIG. 13 is a functional block diagram for explaining a procedure performed by the document image generating apparatus 1 according to the embodiment 2 of the present invention to generate the document image.

The document image generating apparatus 1 according to the embodiment 2 has hardware configurations similar to those of document image generating apparatus 1 according to the embodiment 1. Thus, these similar configurations are provided with the same numerals as the corresponding configurations shown in the embodiment 1, and then omitted the detailed explanations.

Although it is apparent from the comparison of image processing unit 2 shown in FIG. 13 and image processing unit 2 shown in FIG. 2 of embodiment 1, the changing unit 26 in the embodiment 2 does not utilize the original text image layer data representing the original text image layer. However, the changing unit 26 in the embodiment 2 generates character alignment information described later. The generated character alignment information is utilized by the setting unit 23 in the embodiment 2.

Figure 14:
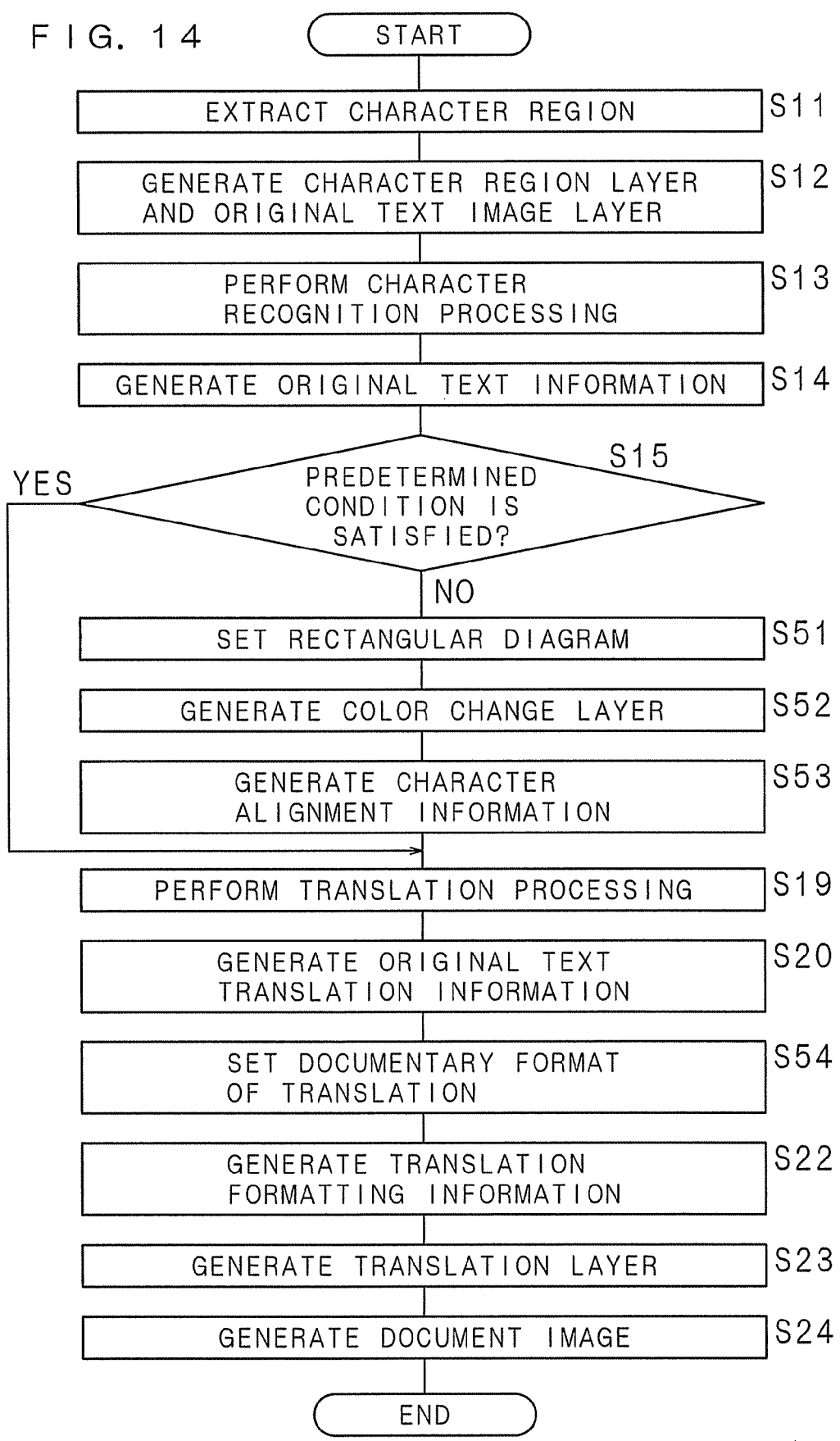
FIG. 14 is a flowchart showing the procedure of image generation processing performed by the document image generating apparatus according to an embodiment 2 of the present invention.

FIG. 14 is a flowchart showing the procedure of image generation processing performed by the document image generating apparatus 1. S11-S15, S19, S20 and S22-24 of image generation processing shown in FIG. 14 are similar to the S11-S15, S19, S20 and S22-24 of image generation processing shown in FIG. 5.

A color change layer according to the embodiment 2 includes a rectangular diagram having a predetermined transparency, although the color change layer according to the embodiment 1 includes the color-filled diagram having the predetermined transparency. In other words, the color change layer according to this embodiment is the character layer.

When the color regarding to the original text does not satisfy the predetermined condition (S15: NO), the changing unit 26 as shown in FIG. 14 sets the color, font size, horizontal magnification rate, horizontal magnification rate, alignment information and the like, for each predetermined unit (S51). The predetermined unit is a word in this embodiment, as shown in FIG. 15 and FIG. 15 described below.

Figure 15:
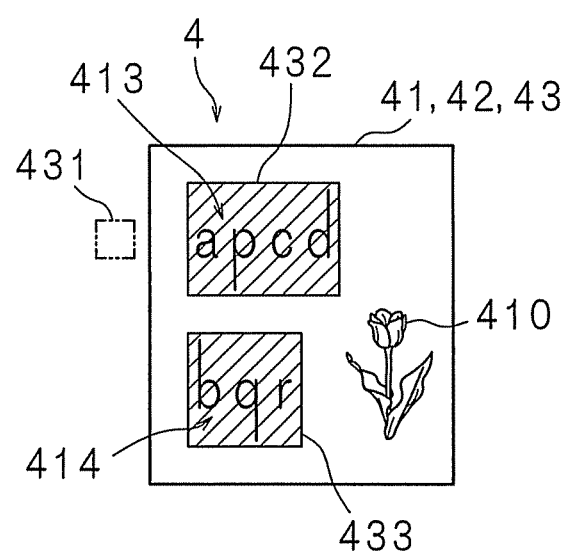
FIG. 15 is a schematic view showing an example of color-change layer generated by the document image generating apparatus according to an embodiment 2 of the present invention.

FIG. 15 is a schematic view showing an example of color-change layer 43 generated by the document image generating apparatus 1.

FIG. 15 illustrates the document image 4 composed of the original text image layer 41, the translation layer 42 and the color change layer 43. The original text image layer 41 and the translation layer 42 are respectively similar to the original text image layer 41 and the translation layer 42 shown in FIG. 6.

When compared with English characters "a", "c" and "r" included in the original texts 413, 414, the English characters "p" and "q" are horizontally long characters and have portions protruding downward and the English characters "b" and "d" are horizontally long characters and have portions protruding upward.

FIG. 15 illustrates a rectangular diagram 431 having a black square shape by imaginary lines.

The rectangular diagram 431 herein has a size enough to completely cover each of English characters "a", "c" and "r" included in the original texts 413, 414. In addition, each of English "b", "d", "p" and "q" can be completely covered by two rectangular diagrams 431 contacting with each other (See FIG. 16). Therefore, single rectangular diagram 431 cannot completely cover plural characters included in the original texts 413, 414.

At the S51 shown in FIG. 14, the changing unit 26 sets the color of rectangular diagram 431 to be a predetermined color, independently from the background color. It is preferred that the predetermined color has a high transparency (e.g., semi-transparent light blue). Although rectangular diagrams 432, 433 described later are respectively configured with some of the rectangular diagram 431, the rectangular diagrams 432, 433 have the hard-to-read color and are unobtrusive at that time.

For setting the color of rectangular diagram 431, the changing unit 26 may detect the background color with a processing similar to the processing at the S16 shown in FIG. 5 in the embodiment 1. At that time, the changing unit 26 sets the color of rectangular diagram 431 to be a color corresponding to the detected background color. Particularly, the changing unit 26 sets the R value, G value and B value of rectangular diagram 431 to be equal to the R value, G value and B value of background, and sets the transparency of rectangular diagram 431 to be higher than the transparency of background. Thus, a user hardly sees the rectangular diagrams 432, 433 shown in the document image 4.

In addition, the changing unit 26 at the S51 shown in FIG. 14 sets the font size of rectangular diagram 431 to be a predetermined font size.

For example, the changing unit 26 may set the font size of rectangular diagram 431, in accordance with the font size of character included in the original text.

Furthermore, the changing unit 26 at the S51 calculates about rectangular areas in which the original texts 413, 414 are respectively aligned. Hereinafter, each of the rectangular areas is referred to as an "original text area" in which each word is aligned. At that time, the changing unit 26 calculates the left X coordinate, top Y coordinate, right X coordinate and bottom Y coordinate of original text area and the vertical length and horizontal length of original text area.

For example, the left X coordinate and bottom Y coordinate of original text area regarding the original text 413 (or original text 414) are the minimum in the left X coordinates and bottom Y coordinates of respective characters included in the original text 413 (or original text 414). Similarly, the right X coordinate and top Y coordinate of original text area regarding the original text 413 (or original text 414) are the maximum in the right X coordinate and top Y coordinate of characters included in the original text 413 (or original text 414).

Then, the changing unit 26 divides the vertical length and horizontal length of original text area regarding the original text 413 (or original text 414) by the vertical length and horizontal length of rectangular diagram 431 to set the vertical magnification and horizontal magnification of rectangular diagram 431. In the case of original text area regarding the original text 413 (or original text 414), the vertical magnification of rectangular diagram 431 is three times and the horizontal magnification of rectangular 431 is four times. In the case of original text area regarding the original text 414), the vertical magnification of rectangular diagram 431 is three times and the horizontal magnification of rectangular 431 is also three times.

When the rectangular diagram 431 is multiplied by these set magnifications, it is possible to obtain the minimum rectangular diagram 432 enough to completely cover the original text 413 (or the minimum rectangular diagram 433 enough to completely cover the original text 414).

Moreover, the changing unit 26 at the S51 sets the alignment positions of rectangular diagrams 432, 433, respectively. At that time, the left X coordinate, top Y coordinate, right X coordinate and bottom Y coordinate of rectangular diagram 432 are respectively equal to the left X coordinate, top Y coordinate, right X coordinate and bottom Y coordinate of original text 413, and the left X coordinate, top Y coordinate, right X coordinate and bottom Y coordinate of rectangular diagram 433 are respectively equal to the left X coordinate, top Y coordinate, right X coordinate and bottom Y coordinate of original text 414.

After the processing at the S51, the changing unit 26 generates the color change layer data (S52). The color change layer represented by the color change layer data generated at the S52 is the color change layer 43 in the case of FIG. 15. In the color change layer 43, the rectangular diagrams 432, 433 having predetermined transparencies are aligned at the places corresponding to the alignment positions of the original texts 413 414 in the original text image layer 41. The rectangular diagrams 432, 433 can completely cover the original text areas regarding the original texts 413, 414.

Although generated by the processing performed at the S51 and S52, the color change layer 43 is not limited to the color change layer 43 shown in FIG. 15.

Figure 16A:
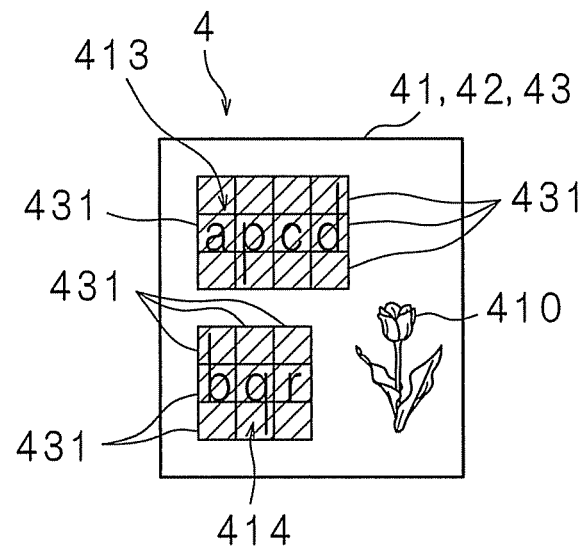
FIG. 16A and FIG. 16B are schematic views showing other examples of color-change layer generated by the document image generating apparatus according to an embodiment 2 of the present invention.
Figure 16B:
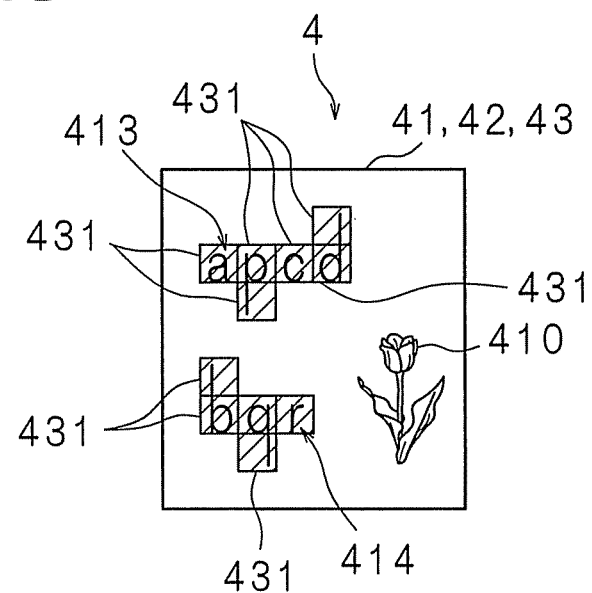

FIG. 16A and FIG. 16B are schematic views showing other examples of color-change layer generated by the document image generating apparatus 1. The document image 4 shown in FIG. 16A and the document image 4 shown in FIG. 16B are similar to the document image 4 shown in FIG. 15.

However, the color change layer 43 shown in FIG. 16A includes a total of 21 rectangular diagrams 431, 431, . . . (12 rectangular diagrams corresponding to the original text area regarding the original text 413, and 9 rectangular diagrams corresponding to the original text area regarding the original text 414) and the color change layer 43 shown in FIG. 16B includes a total of 11 rectangular diagrams 431, 431, . . . (6 rectangular diagrams corresponding to the original text area regarding the original text 413, and 5 rectangular diagrams corresponding to the original text area regarding the original text 414), although each color change layer 43 shown in FIG. 15 includes single rectangular diagram 432 (or 433).

Firstly, it will be described about the color change layer 43 shown in FIG. 16A. The rectangular diagram 431 has a color and a font size equal to those of rectangular diagram 431 shown in FIG. 15, and has a vertical magnification being one times and a horizontal magnification being one times. In this color change layer 43, plural rectangular diagrams 431, 431, . . . are aligned in contact with each other for a predetermined unit, i.e., each word.

Thus, the changing unit 26 at the S51 shown in FIG. 14 sets the color, font size, vertical magnification and horizontal magnification of rectangular diagram 431 to be a predetermined color, font size and character magnification (1×1, in this case).

The changing unit 26 at the S51 calculates the original text area regarding the original text 413 and the original text area regarding the original text 414. At that time, the changing unit 26 calculates the left X coordinate, top Y coordinate, right X coordinate, bottom Y coordinate, vertical length and horizontal length of each original text area.

Next, the changing unit 26 calculates the minimum number of rectangular diagrams 431, 431, . . . enough to completely cover each original text area, in accordance with the vertical length and horizontal length of original text area and the vertical length and horizontal length of rectangular diagram 431. In the case of original text area regarding original text 413 (or original text 414), the minimum number of rectangular diagrams 431, 431, . . . enough to completely cover the original text area is 12 (or 9).

Then, the changing unit 26 calculates the alignment position of each rectangular diagram 431. For example, in the case of original text area regarding the original text 413 (or original text 414), the left X coordinate and top Y coordinate of rectangular diagram 431 aligned at the left top side of original text area are equal to the left X coordinate and top Y coordinate of original text area.

Next, it will be described about the color change layer 43 shown in FIG. 16B.

In this color change layer 43, plural rectangular diagrams 431, 431, . . . are aligned for a predetermined unit, i.e., each word, in accordance with the shape of character included in each word.

Thus, the changing unit 26 at the S51 shown in FIG. 14 sets the color, font size, vertical magnification and horizontal magnification of rectangular diagram 431 to be a predetermined color, font size and character magnification (1×1, in this case).

In addition, the changing unit 26 at the S51 calculates an area where a character is aligned (referred to as character alignment area) for each of the original texts 413, 414. In the calculated character alignment area, the shape of each character is reflected. Particularly, the changing unit 26 calculates the left X coordinate, top Y coordinate, right X coordinate and bottom Y coordinate of each character included in the original text 413 (or original text 414).

Then, the changing unit 26 sets the alignment positions of rectangular diagrams 431, 431, . . . to completely cover each character alignment area.

The changing unit 26 may set the vertical magnification and horizontal magnification of rectangular diagram 431, in accordance with the shape of each character. In this case, for example, the rectangular diagram corresponding to each of English characters "a", "c" and "r" may be 1×1 time the size of rectangular diagram 431, and the rectangular diagram corresponding to each of English characters "b", "d", "p" and "q" may be 1×2 times of rectangular diagram 431.

After the processing at the S52, the changing unit 26 generates character alignment information as shown in FIG. 14 (S53). The character alignment information includes the left X coordinate, top Y coordinate, right X coordinate and bottom Y coordinate of area where, for example, each of the rectangular diagrams 432, 433 shown in FIG. 15 is aligned.

The character alignment information is utilized for preventing the rectangular diagram from overlaying the translation.

After the processing at the S53, the image processing unit 2 proceeds the procedure to the S19.

Figure 17A:
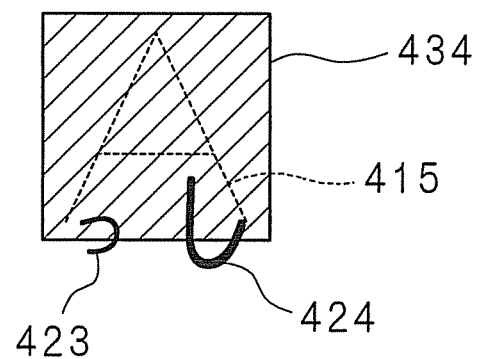
FIG. 17A and FIG. 17B are schematic views for explaining a prevention processing of rectangular diagram from overlaying a translation.
Figure 17B:
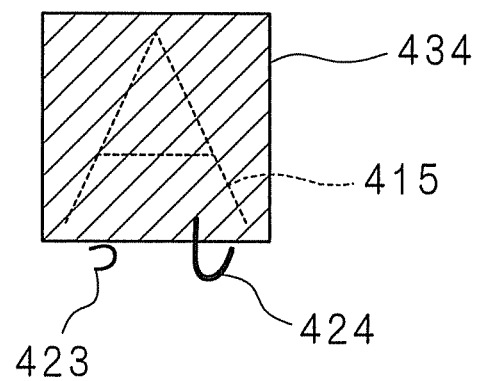

FIG. 17A and FIG. 17B are schematic views for explaining a prevention processing of rectangular diagram 434 from overlaying translations 423, 424. The translations 423, 424 are provided at the interline space of original text 415. FIG. 17A illustrates a case before the prevention of rectangular diagram 434 from overlaying the translations 423, 434, and FIG. 17B illustrates a case after the prevention of rectangular diagram 434 from overlaying the translations 423, 434.

As shown in FIG. 17, the original text 415 is an English character "A", the translation 423 is a Japanese hiragana character "つ", and the translation 424 is a Japanese hiragana character "し". Compared with the Japanese hiragana character "つ", the Japanese hiragana character "し" has a portion protruding upward.

The translations 423, 434 are adjacently aligned in the same row.

The rectangular diagram 434 covers the original text area regarding the original text 415. In the case that the interline space is narrow, it is difficult to separately align the translations 423, 424 and original text area. Thus, the top half portion of translation 423 overlays the rectangular diagram 434, and the top three-quarter portion of translation 423 overlays the rectangular diagram 434.

Herein, it should be considered to limit the overlayment of area aligning characters included in the translation and area aligning the rectangular diagrams not more than a predetermined value (for example, 50%). In this case, it can be allowed to overlay the alignment area of translation 423 on the alignment area of rectangular diagram 434, but not the alignment area of translation 424 on the alignment area of rectangular diagram 434.

It can be considered to shift the alignment position of translation 424 downward for limiting the alignment area of translation 424 on the alignment area of rectangular diagram 434 not more than the predetermined value. However, translation 424 may happen to overlay another original text at the next row of original text 415 in that case. Thus, the font size of character included in the translation 424 is reduced in this embodiment, for limiting the alignment area of translation 424 on the alignment area of rectangular diagram 434 not larger than the predetermined value. At that time, the font size of translation 423 should be equal to the post-reduced font size of translation 424, for preventing the reduction of readability and aesthetic caused by the mismatch of font sizes of words aligned in the same row.

As shown in FIG. 17B, the font sizes of characters included in translations 423, 424 are reduced from the font sizes shown in FIG. 17A. Thus, the translation 423 does not overlay the rectangular diagram 434, and the top half portion of translation 424 overlays the rectangular diagram 434. In other words, it is implemented to limit the overlayment of translations 423, 424 and rectangular diagram 434.

After the processing at the S20, the setting unit 23 sets the documentary format of translation in accordance with the original text translation information generated at the S20 and the character alignment information generated at the S53, as shown in FIG. 14 (S54). At that time, the setting unit 23 temporally sets the font size as shown in the embodiment 1 and then determines whether the overlayment of translation having the temporally set font size and rectangular diagram is not more than the predetermined value or not. When having determined that the overlayment is more than the predetermined value, the setting unit 23 sets the font size regarding the translation to become adequately smaller than the temporally set font size.

The setting unit 23 described above serves as the limiting means according to this embodiment of the present invention.

After the processing at the S54, the image processing unit 2 proceeds the procedure to the S22.

Alternatively, it may be configured to proceeds the procedure to the S51 when the setting unit 23 has determined that the overlayment of translation and rectangular diagram is more than the predetermined value. In this alternative case, the changing unit 26 re-sets the font size, alignment position and the like of rectangular diagram to make the overlayment of translation and rectangular diagram become not more than the predetermined value.

The document image generating apparatus 1 described above leads similar advantages to those of document image generating apparatus 1 described in the embodiment 1.

Embodiment 3

Figure 18:
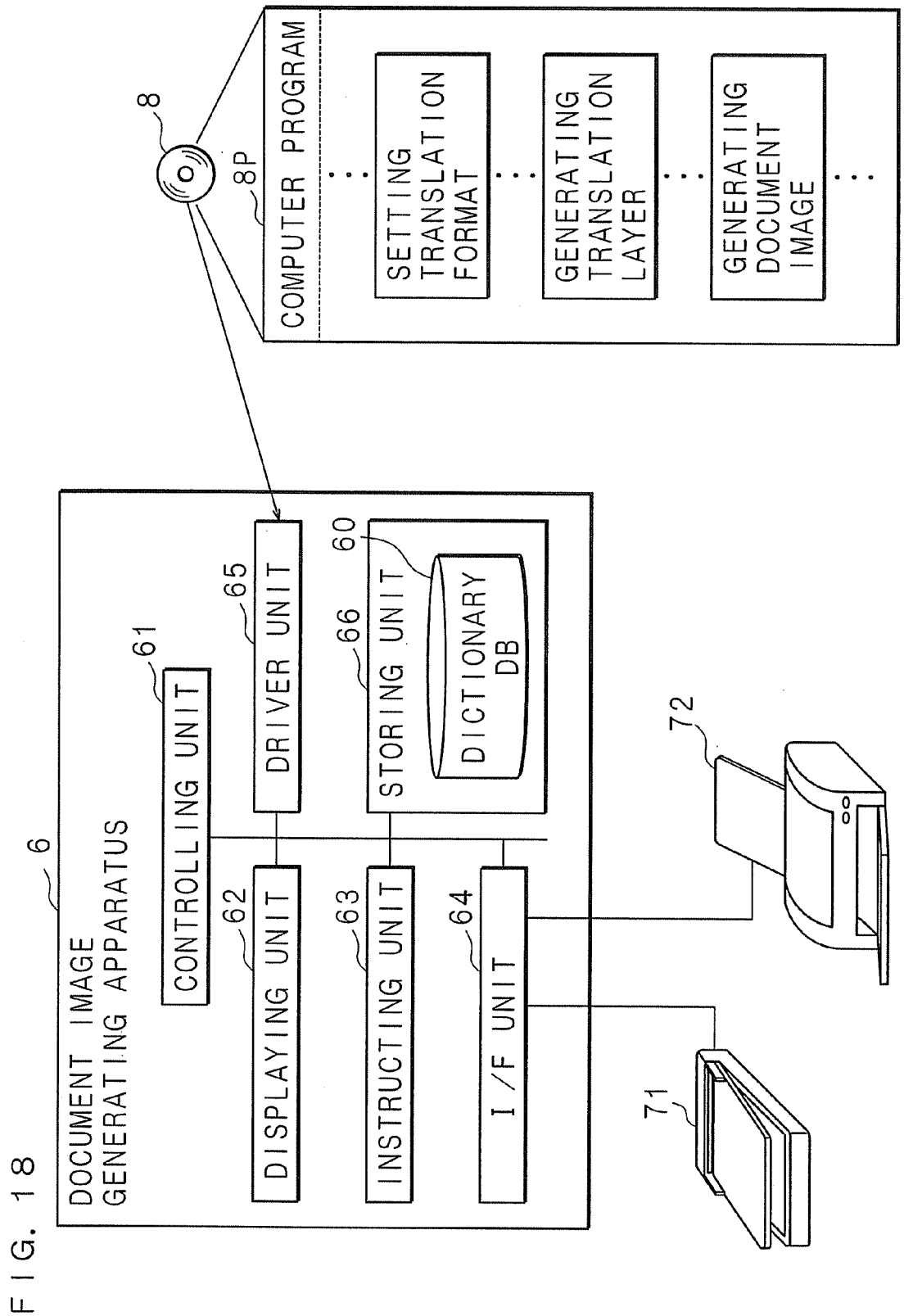
FIG. 18 is a block diagram schematically showing a configuration of document image generating apparatus according to an embodiment 3 of the present invention.

FIG. 18 is a block diagram schematically showing a configuration of document image generating apparatus 6 according to an embodiment 3 of the present invention.

The document image generating apparatus 6 illustrated in this embodiment 3 consists of a PC, although the document image generating apparatus 1 illustrated in the embodiments 1 and 2 consists of the digital multi-function printer.

The document image generating apparatus 6 includes a controlling unit 61, a displaying unit 62, an instructing unit 63, an interface (I/F) unit 64, a driver unit 65 and storing unit 66.

The controlling unit 61 is a center for controlling the document image generating apparatus 6, utilizes a RAM (not shown) as a work area, and controls each unit of the document image generating apparatus 6 to perform several processing.

The driver unit 65 consists of, e.g., a CD-ROM drive and reads several information from a storing medium 8 placed in the driver unit 65.

The storing medium 8 consists of, e.g., an optical disk and stores computer program 8P. The computer program 8P servers as the computer program according to this embodiment of the present invention.

The storing unit 66 consists of a large capacity non-volatile storage and stores dictionary DB 60.

The controlling unit 61 reads out the computer program 8P from the storing medium 8 placed in the driver unit 65, and stores the read computer program 8P in the storing unit 66. In addition, the controlling unit 61 loads the computer program 8P on the RAM, and implements the document image generating method according to this embodiment of the present invention in accordance with the loaded computer program 8P.

The displaying unit 62 consists of, e.g., a liquid crystal display, and is controlled by the controlling unit 61 to display a color image based on a document image.

The instructing unit 63 consists of a keyboard and a mouse, for allowing a user to utilize the document image generating apparatus 6. The user can utilize the instructing unit 63 to input several instructions into the document image generating apparatus 6. The input instructions are transferred to the controlling unit 61.

The I/F unit 64 is for connecting the document image generating apparatus 6, an image reading apparatus 71 outside the document image generating apparatus 6 and an image recording apparatus 72 outside the document image generating apparatus 6.

The image reading apparatus 71 is e.g., a color scanner, a digital multi-function printer serving as the color scanner or the like, and optically reads a color image recorded on a recording paper, a book and the like placed on the image reading apparatus 71. The image reading apparatus 71 sends the read color image (i.e., the original text image) to the document image generating apparatus 6.

The controlling unit 61 of document image generating apparatus 6 receives the original text image sent from the image reading apparatus 71 through the I/F unit 64.

The controlling unit 61 generates a document image in accordance with the received original text image. Thus, the controlling unit 61 performs processing similar to the image generation processing shown in FIG. 5 of the embodiment 1 or shown in FIG. 14 of the embodiment 2. At that time, the controlling unit 61 serves as the deciding means, the changing means, the setting means, the generating means, the compositing means, and the limiting means according to this embodiment of the present invention.

In addition, when having generated at least one document image, the controlling unit 61 continuously performs processing similar to the document display processing shown in FIG. 7 of the embodiment 1 until all of generated document images are deleted. As the result, the displaying unit 62 displays the color image in accordance with the document image.

Or, the controlling unit 61 sends the generated document image to the image recording apparatus 72 through the I/F unit 64.

The image recording apparatus 72 consists of a color printer, a digital multi-function printer serving as the color printer or the like, and records the color image based on the received document image onto a recording paper.

It is not limited that the original text image is sent from outside and then received. For example, the original text image may be generated by a user who looks at the displaying unit 62 and handles the instructing unit 63.

Furthermore, it is not limited that the translation is automatically generated from the original text. For example, a user may generate the translation and the document image generating apparatus 6 may utilize the translation generated by the user.

Moreover, the document image generated by the document image generating apparatus 6 may be utilized by the PC 3 shown in the embodiment 1.

In the embodiments 1-3, the original text and the translation are aligned together in the annotation added document. The present invention is not limited to this illustration. In the annotation added document image, it may be configured to align the original text, the annotation of original text, the kana reading of original text, the phonetic alphabets of original text, the Pinyin of original text or the like, together. Further, the present invention is not limited in the case that the original text is English and the translation is Japanese.

Furthermore, the original text image and the document image may be monochrome images, but not the color images.

Moreover, the document image generating apparatuses 1, 6 may generate the document images in a format but not in the PDF.

It will be described about the differences between the prior arts and the embodiments 1 and 2 according to the present invention.

Japanese Patent Application Laid-Open No. 2009-53838 describes about the translating apparatus that determines the color regarding the translation in accordance with the background color.

Japanese Patent Application Laid-Open No. 2005-157412 describes about the translating apparatus that determines the color of word included in the original text and the color of phrase translated from the word, for clearly showing the correspondence of the word and the translation.

As described above, the prior arts do not determine the color of translation in accordance with the color regarding to the original text. Furthermore, the prior arts do not describe to obtain the document image keeping the layout of original text present in the original text image. Moreover, the prior arts do not describe to keep the readability of original text and translation even in the case that the interline space is narrow.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A document image generating apparatus, comprising:
an accepting unit that accepts an original image;
an extracting unit that extracts an original text from the original image accepted by the accepting unit;
a translation generating unit that generates translation corresponding to the original text extracted by the extracting unit;
a translation color setting unit that sets a color of the translation generated by the translation generating unit; and
a document image generating unit that generates a document image in which the translation generated by the translation generating unit is added with the color set by the translation color setting unit to the original image accepted by the accepting unit, wherein
in the document image generated by the document image generating unit, a color of the original text is different from the color of the translation;
the apparatus further comprising:
a layer generating unit that generates an original layer representing the original image accepted by the accepting unit and a translation layer representing the translation generated by the translation generating unit, wherein the document image generating unit composites the original layer and the translation layer generated by the layer generating unit, in order to generate the document image;
a determining unit that determines whether the color of original text extracted by the extracting unit satisfies a predetermined condition or not; and
an original text color changing unit that changes the color of original text in the document image to be a color which satisfies the predetermined condition when the determining unit determines that the color of original text extracted by the extracting unit does not satisfy the predetermined condition, and that fails to change the color of original text in the document image to be the color which satisfies the predetermined condition when the determining unit determines that the color of original text extracted by the extracting unit satisfies the predetermined condition, wherein the color set by the translation color setting unit does not satisfy the predetermined condition.

2. A document image generating apparatus according to claim 1, further comprising:

a selecting unit that selects either an original text priority mode for preferring a visibility of the original text or a translation priority mode for preferring a visibility of the translation, wherein when the selecting unit selects the original text priority mode, the visibility of the original text becomes higher than the visibility of the translation in the document image, and when the selecting unit selects the translation priority mode, the visibility of the translation becomes higher than the visibility of the original text in the document image.

3. A document image generating apparatus according to claim 2, wherein when the selecting unit selects the original text priority mode in the case that a background color of the document image is white, a lightness of the original text becomes lower than a lightness of the translation in the document image, and when the selecting unit selects the translation priority mode in the case that the background color of the document image is white, the lightness of the translation becomes lower than the lightness of the original text in the document image.

4. A document image generating apparatus according to claim 2, wherein when the selecting unit selects the original text priority mode in the case that a background color of the document image is white, a saturation of the original text becomes higher than a saturation of the translation in the document image, and when the selecting unit selects the translation priority mode in the case that the background color of the document image is white, the saturation of the translation becomes higher than the saturation of the original text in the document image.

5. A document image generating apparatus according to claim 2, wherein when the selecting unit selects the original text priority mode in the case that a background color of the document image is white, a non-transparency of the original text becomes higher than a non-transparency of the translation in the document image, and when the selecting unit selects the translation priority mode in the case that the background color of the document image is white, the non-transparency of the translation becomes higher than the non-transparency of the original text in the document image.

6. A document image generating apparatus according to claim 1, further comprising:

a dividing unit that divides the translation generated by the translation generating unit into plural divisional translations, wherein the translation color setting unit sets a color of each of the plural divisional translations, in order to set the color of translation generated the translation generating unit.

7. A document image generating unit according to claim 1, wherein the layer generating unit further generates a color change layer, the original text color changing unit utilizes the color change layer generated by the layer generating unit to change the color of the original text, and the document image generating unit composites the original layer, the translation layer and the color change layer generated by the layer generating unit to generate the document image.

8. A document image generating apparatus according to claim 7, wherein the color change layer generated by the layer generating unit comprises a color-filled diagram having a predetermined transparency, and a position of the color-filled diagram in the color change layer corresponds to a position of the original text in the original layer.

9. A document image generating apparatus according to claim 8, wherein a shape of the color-filled diagram is rectangle.

10. A document image generating apparatus according to claim 9, further comprising:

a separating unit that separates the original text extracted by the extracting unit into plural divisional original texts, wherein in the color change layer generated by the layer generating unit, single of the color-filled diagram is arranged for each of the plural divisional original texts.

11. A document image generating apparatus according to claim 9, further comprising:

a separating unit that separates the original text extracted by the extracting unit into plural divisional original texts, wherein in the color change layer generated by the layer generating unit, plural of the color-filled diagram are arranged for each of the plural divisional original texts.

12. A document image generating apparatus according to claim 11, further comprising:

a magnification setting unit that sets vertical and horizontal magnifications of the plural of the color-filled diagram in accordance with shapes of characters included each of the plural divisional original texts.

13. A document image generating apparatus according to claim 11, further comprising:

an arrangement position setting unit that sets positions for arranging the plural of the color-filled diagram in accordance with shapes of characters included each of the plural divisional original texts.

14. A document image generating apparatus according to claim 8, further comprising:

a color-filled diagram color setting unit that sets a color of the color-filled diagram to be a color corresponding to a background color of the original image accepted by the accepting unit.

15. A document image generating apparatus according to claim 8, further comprising:

a limiting unit that adjusts a position of the translation in the translation layer and a position of the color-filled diagram in the color change layer, and that limits an overlayment of a position of the translation and a position of the color-filled diagram in the document image.

16. A document image generating method, comprising steps of:

accepting an original image;

extracting an original text from the accepted original image;

generating a translation corresponding to the extracted original text;

setting a color of the generated translation;

generating an original layer representing the original image and a translation layer representing the translation and compositing the original layer and the translation layer;

determining whether the color of original text satisfies a predetermined condition or not;

changing the color of original text in the document image to be a color which satisfies the predetermined condition when the color of original text does not satisfy the predetermined condition, and that fails to change the color of original text in the document image to be the color which satisfies the predetermined condition when the color of original text satisfies the predetermined wherein the color set by a translation color setting unit does not satisfy the predetermined condition; and generating a document image in which the generated translation is added with the set color to the accepted original image, wherein in the generated document image, a color of the original text is different from the color of the translation.

17. A non-transitory computer readable medium having stored thereon computer executable program for processing data, wherein the computer program when executed causes a computer system to execute steps of:

accepting an original image;

extracting an original text from the accepted original image;

generating a translation corresponding to the extracted original text;

setting a color of the generated translation;

generating a document image in which the generated translation is added with the set color to the accepted original image, wherein in the generated document image, a color of the original text is different from the color of the translation;

generating an original layer representing the original image and a translation layer representing the translation and compositing the original layer and the translation layer;

determining whether the color of original text satisfies a predetermined condition or not; and changing the color of original text in the document image to be a color which satisfies the predetermined condition when the color of original text does not satisfy the predetermined condition, and that fails to change the color of original text in the document image to be the color which satisfies the predetermined condition when the color of original text satisfies the predetermined wherein the color set by a translation color setting unit does not satisfy the predetermined condition.

* * * * *